United States Patent
Jung et al.

(10) Patent No.: US 10,929,005 B2
(45) Date of Patent: Feb. 23, 2021

(54) ELECTRONIC DEVICE, WEARABLE DEVICE, AND METHOD OF CONTROLLING DISPLAYED OBJECT IN ELECTRONIC DEVICE

(71) Applicant: Samsung Electronics Co., Ltd., Gyeonggi-do (KR)

(72) Inventors: Jong-Woo Jung, Gyeonggi-do (KR); In-Sik Myung, Incheon (KR); Jung-Won Lee, Seoul (KR); In-Young Choi, Seoul (KR); Hyun-Soo Nah, Seoul (KR); Jong-Kee Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 189 days.

(21) Appl. No.: 15/854,919

(22) Filed: Dec. 27, 2017

(65) Prior Publication Data
US 2018/0181274 A1    Jun. 28, 2018

(30) Foreign Application Priority Data

Dec. 27, 2016    (KR) .................. 10-2016-0180017

(51) Int. Cl.
*G06F 3/0487*    (2013.01)
*G06F 1/16*    (2006.01)
(Continued)

(52) U.S. Cl.
CPC ....... *G06F 3/0487* (2013.01); *G02B 27/0176* (2013.01); *G06F 1/163* (2013.01);
(Continued)

(58) Field of Classification Search
CPC .... G06F 3/0487; G06F 3/0362; G06F 3/0485; G06F 1/163; G06F 3/011
See application file for complete search history.

(56) References Cited

U.S. PATENT DOCUMENTS 8,239,784 B2    8/2012    Hotelling et al.
8,607,166 B2 *  12/2013   Jalon ..................... G06F 3/0481
                                                       715/838
(Continued)

FOREIGN PATENT DOCUMENTS

JP    2016-504646 A      2/2016
KR   10-2011-0022217 A   3/2011

*Primary Examiner* — Nhat Huy T Nguyen
(74) *Attorney, Agent, or Firm* — Cha & Reiter, LLC.

(57) ABSTRACT

Disclosed are an electronic device and a method of controlling a displayed object by an electronic device. The electronic device includes a display, a communication unit, and a processor executing instructions to implement the method. The method includes when detecting communication with an external electronic device, displaying one or more windows corresponding to one more applications, displaying selection of a window of the one or more windows responsive to a first input received from the external electronic device, when a first window of the one or more windows is selected, displaying a first user interface for controlling a first application displayed within the first window and when a second input is received from the external electronic device while the first window remains selected, and displaying scrolling of displayed content of the first application within the first window, while maintaining the first user interface on the first window.

19 Claims, 24 Drawing Sheets

(51) Int. Cl.

| | | |
|---|---|---|
| *G06F 3/01* | (2006.01) | |
| *G06F 3/0362* | (2013.01) | |
| *G06F 3/0482* | (2013.01) | |
| *G06F 3/0485* | (2013.01) | |
| *G06F 3/0484* | (2013.01) | |
| *G06F 3/0346* | (2013.01) | |
| *G06F 3/0354* | (2013.01) | |
| *G06F 3/0481* | (2013.01) | |
| *G02B 27/01* | (2006.01) | |
| *G06F 3/0488* | (2013.01) | |

(52) U.S. Cl.
CPC ............ *G06F 3/011* (2013.01); *G06F 3/0346* (2013.01); *G06F 3/0362* (2013.01); *G06F 3/03547* (2013.01); *G06F 3/0482* (2013.01); *G06F 3/0485* (2013.01); *G06F 3/0488* (2013.01); *G06F 3/04815* (2013.01); *G06F 3/04842* (2013.01); *G06F 3/04845* (2013.01); *G02B 2027/0134* (2013.01); *G02B 2027/0136* (2013.01); *G06F 2203/04806* (2013.01)

(56) References Cited

U.S. PATENT DOCUMENTS

| | | | |
|---|---|---|---|
| 2003/0142132 A1* | 7/2003 | Brown | G06F 3/0481 715/768 |
| 2008/0062141 A1* | 3/2008 | Chandhri | G06F 3/0482 345/173 |
| 2009/0313564 A1* | 12/2009 | Rottler | G11B 27/105 715/764 |
| 2015/0111558 A1 | 4/2015 | Yang | |
| 2015/0248204 A1 | 9/2015 | Morita et al. | |
| 2016/0088060 A1* | 3/2016 | Rahman | H04L 67/025 715/740 |

\* cited by examiner

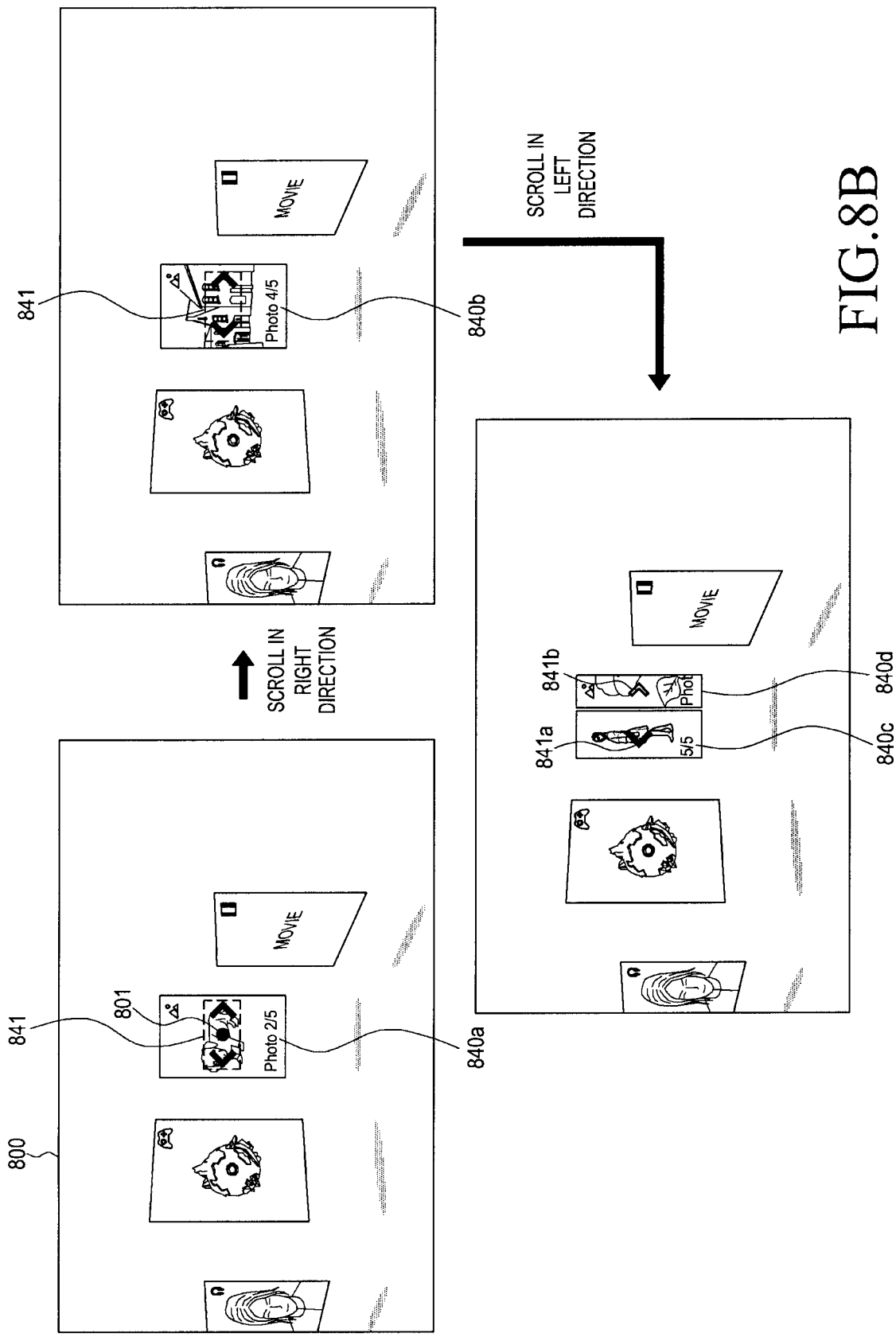

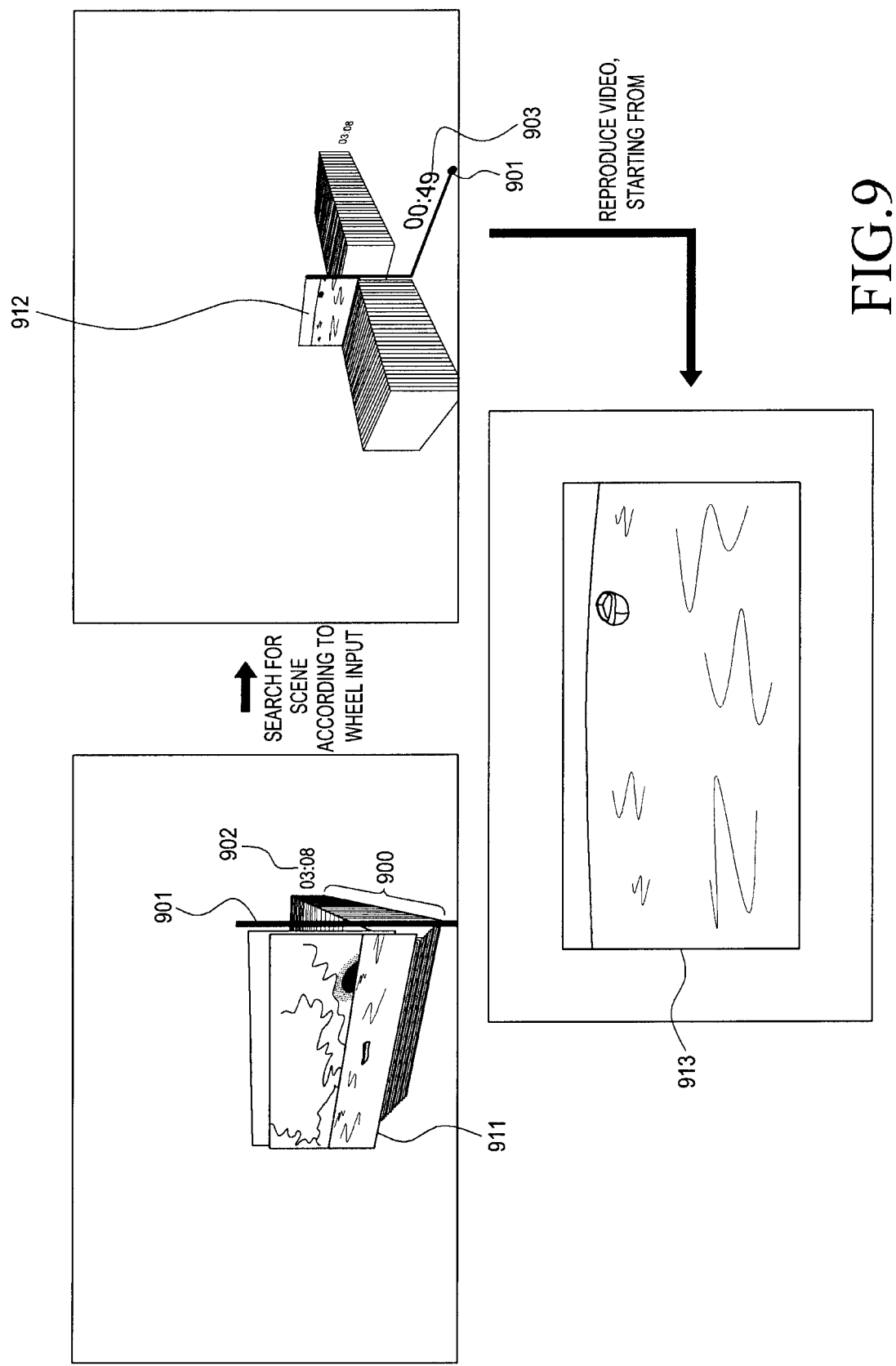

ELECTRONIC DEVICE, WEARABLE DEVICE, AND METHOD OF CONTROLLING DISPLAYED OBJECT IN ELECTRONIC DEVICE

CLAIM OF PRIORITY

This application claims priority under 35 U.S.C. § 119(a) to Korean Application Serial No. 10-2016-0180017, which was filed in the Korean Intellectual Property Office on Dec. 27, 2016, the entire content of which is hereby incorporated by reference.

TECHNICAL FIELD

The present disclosure relates to an electronic device, a wearable device, and a method of controlling a displayed object in an electronic device.

BACKGROUND

Among electronic devices, there are some which are provided to be wearable on bodies. Such electronic devices are generally referred to as wearable devices, and various types of wearable devices have been developed. For example, the wearable device that can be attached to/detached from bodies and clothes is provided in various forms such as a head-mounted type (glasses), a wrist-mounted type (watch or wristband), a contact lens type, a ring type, a shoe type, and a cloth type. The wearable device corresponds to an electronic device wearable on clothes, glasses, or bodies to increase portability and accessibility.

Among electronic devices wearable on bodies, a head-mounted wearable device such as a Head-Mounted Display (HMD) is actively being developed. The HMD may be largely divided into a see-through type which provides Augmented Reality (AR) and a see-closed type which provides Virtual Reality (VR) to provide an image.

The see-through type HMD may compose and combine virtual targets or objects on the basis of the real world using characteristics of a semi permeable lens to reinforce additional information which is difficult to acquire based on the real world alone. The see-closed type HMD is an electronic device having two displays in front of the user's eyes, and may provide excellent immersion to the user since the user can enjoy contents (games, movies, streaming, broadcasts and the like) provided by an external input through an independent screen while being alone.

SUMMARY

When a user desires to control an electronic device while wearing a wearable device functionally connected to the electronic device, the user may control movement or execution of a displayed object through the electronic device by moving his/her body part (for example, the head or eyes). However, since the user controls the displayed object through his/her body part, the user may feel fatigue feeling if the controlled object is small or precise handling is required.

In an electronic device, a wearable device, and a method of controlling a displayed object by an electronic device according to various embodiments of the present disclosure, it is possible to control various objects displayed in the electronic device based on a wheel input received from an external electronic device, and as the selected object is located in a particular area, display various functions which can be controlled based on the wheel input in the area.

In accordance with an aspect of the present disclosure, an electronic device is disclosed, including a display device, a communication unit for communicating with an external electronic device, a processor functionally connected to the display device, and a memory functionally connected to the processor, storing instructions executable by the processor to cause the processor to: control the display device to display one or more windows corresponding to one more applications, control the display device to indicate selection of a window of the one or more windows responsive to a first input received from the external electronic device, when a first window of the one or more windows is selected, control the display device to display a first user interface for controlling a first application displayed within the first window, and when a second input is received from the external electronic device while the first window remains selected, control the display device to display scrolling of displayed content of the first application within the first window, while maintaining the first user interface on the first window.

In accordance with an aspect of the present disclosure, a method in an electronic device is disclosed, including when communication with an external electronic device is detected, controlling a display device to display one or more windows corresponding to one more applications, controlling the display device to indicate selection of a window of the one or more windows responsive to a first input received from the external electronic device, when a first window of the one or more windows is selected, controlling the display device to display a first user interface for controlling a first application displayed within the first window, and when a second input is received from the external electronic device while the first window remains selected, controlling the display device to display scrolling of displayed content of the first application within the first window, while maintaining the first user interface on the first window.

In accordance with an aspect of the present disclosure, a non-transitory storage medium storing instructions executable by at least one processor to cause the at least one processor to perform at least one operation, the at least one operation including when communication with an external electronic device is detected, controlling a display device to display one or more windows corresponding to one more applications, controlling the display device to indicate selection of a window of the one or more windows responsive to a first input received from the external electronic device, when a first window of the one or more windows is selected, controlling the display device to display a first user interface for controlling a first application displayed within the first window, and when a second input is received from the external electronic device while the first window remains selected, controlling the display device to display scrolling of displayed content of the first application within the first window, while maintaining the first user interface on the first window.

In an electronic device and a method of controlling a displayed object by an electronic device according to various embodiments of the present disclosure, when the selected object overlaps a particular window area, by displaying a function, which can be controlled by a wheel input, on a window, a user can adjust a wheel included in an external electronic device so as to control the object displayed through the electronic device and perform various functions of an application associated with object.

BRIEF DESCRIPTION OF THE DRAWINGS

The above and other aspects, features, and advantages of the present disclosure will be more apparent from the following detailed description taken in conjunction with the accompanying drawings, in which:

FIG. 8A, FIG. 8B and FIG. 8C illustrate various examples of a display screen including an object controlled by a wheel input according to various embodiments of the present disclosure;

FIG. 9 illustrates an example of controlling a display object according to a wheel input of an external electronic device when an application is executed according to various embodiments of the present disclosure;

DETAILED DESCRIPTION

Figure 1:
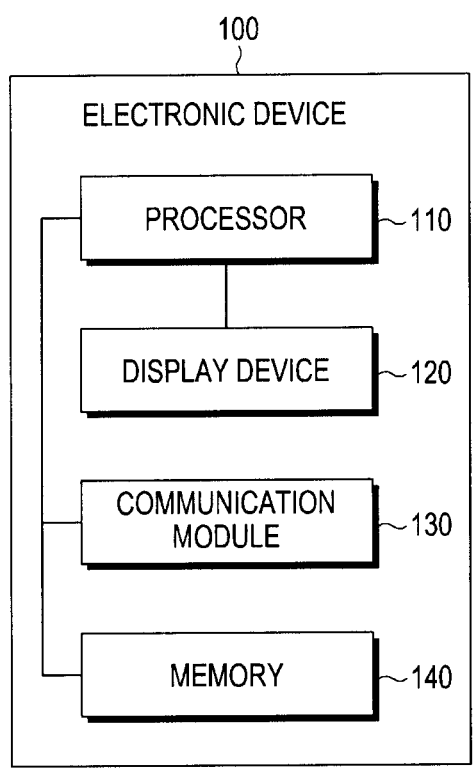
FIG. 1 is a block diagram illustrating an example of a configuration of an electronic device according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices.

The electronic device according to one embodiment of the present disclosure is not limited to the above described devices. As used herein, the term "user" may indicate a person who uses an electronic device or a device (e.g., an artificial intelligence electronic device) that uses an electronic device.

An object according to various embodiments of the present disclosure corresponds to image data displayed on a screen output through a display device of an electronic device, and may be moved on the screen according to a control of a processor of the electronic device or displayed with changed display settings (for example, color, size, or brightness) thereof.

A window according to various embodiments of the present disclosure corresponds to a screen area including at least the part of the screen, and, on the window, an execution screen of a content or an application designated to a particular object or a user interface according to the type of content and application may be displayed.

A (user) interface according to various embodiments of the present disclosure may include, when displayed on the screen, instructions for controlling at least one object included in the content and the execution screen according to a wheel input.

FIG. 1 is a block diagram illustrating an example of a configuration of an electronic device according to various embodiments of the present disclosure.

Referring to FIG. 1, an electronic device 100 may include a processor 110, a display device 120, a communication module 130, and a memory 140.

The processor 110 may control the general operations of the electronic device 100. For example, the processor 110 may receive a wheel input from an external electronic device connected to the electronic device 100 and control an object displayed through the electronic device 100.

According to various embodiments of the present disclosure, the processor 110 may control the display device 120 to display an HMD mode screen as the electronic device 100 is connected to a wearable device or a predetermined input is identified. For example, the HMD mode screen may display at least one object and a selected object.

According to various embodiments of the present disclosure, the processor 110 may move the selected object based on the wheel input received from the external electronic device or, as the selected object is located in an area of a particular object, perform control to execute a function of an application designated to the object. The wheel input may include information on a rotation direction, a rotation quantity, or the number of rotations of a wheel dial member.

The display device 120 may output an HMD mode display screen including a window which corresponds to a part of the screen and a selected object.

According to various embodiments of the present disclosure, the object may be displayed in the form of an icon or an image on the window which corresponds to at least some areas of the screen of the display device 120. For example, as the selected object is located within an area of a particular object, the electronic device 100 may identify that the corresponding object is selected.

According to various embodiments of the present disclosure, an interface may include buttons or indications for performing various functions according to the type of contents corresponding to the object and may be configured in various forms.

According to various embodiments of the present disclosure, the type of contents may include a media file (for example, music, images, and videos), a media file list, a three-dimensional image (for example, three-dimensional images or map images), and a list of applications purchased through an application market.

According to various embodiments of the present disclosure, the interface may include buttons or indications for performing a function of executing (or reproducing) a previous/next file (for example, images or music), a function of reproducing a media file, a function of searching for a screen in a video, a function of controlling a volume, a function of searching for a file, and a function of zooming in/out a three-dimensional image, and further include various other functions which can be controlled according to the wheel input.

The communication module 130 may receive wheel input information from an external electronic device including the wheel dial member. For example, although it is described that the wheel input is received from a device outside the electronic device 100, the electronic device 100 may include the wheel dial member or may be functionally connected to a circuit for detecting an input from the wheel dial member to internally receive the wheel input.

According to various embodiments of the present disclosure, the memory 140 may store instructions configured to be executed by the processor 110. For example, the instructions may be configured to cause the processor 110 to identify a functional connection with an external electronic device, display at least one window corresponding to at least one application, display a selected object such that the selected object moves according to a first input received from the external electronic device, when the selected object is located on a first window of the at least one window corresponding to a first application, display a first user interface for controlling the first application on the first window, and scroll and display content provided by the first application on the first window according to a second input received from the external electronic device while the first user interface is displayed on the first window.

According to various embodiments of the present disclosure, the instructions may be configured to cause the processor 110 to identify a gesture input detected through a sensor included in the external electronic device as the first input and identify a wheel input indicating a rotation quantity, a rotation direction, or a rotation speed of a wheel member included in the external electronic device as the second input.

According to various embodiments of the present disclosure, when the content is a list of at least one media file, the instructions may be configured to cause the processor 110 to display a button for performing a function of displaying a previous file or a next file according to the rotation direction indicated by the second input on the first user interface.

According to various embodiments of the present disclosure, when the content is a video or a three-dimensional image, the instructions may be configured to cause the processor 110 to output the video or the three-dimensional image on the first window according to the rotation quantity indicated by the second input.

According to various embodiments of the present disclosure, the instructions may be configured to cause the processor 110 to receive a third input indicating a predetermined rotation quantity from the external electronic device while the video is output, display an indicator indicating a particular scene among scenes of the video on the first user interface, and, when a first wheel input is received from the external electronic device while the indicator is displayed, reproduce the video, starting from a first scene corresponding to the first wheel input, among the scenes of the video.

According to various embodiments of the present disclosure, when the content is the three-dimensional image, the instructions may be configured to cause the processor 110 to display a third user interface for controlling the display of the three-dimensional image according to a second wheel input received from the external electronic device on the three-dimensional image.

According to various embodiments of the present disclosure, the instructions may be configured to cause the processor 110 to display the third user interface including a function for zooming in or out and displaying the three-dimensional image according to the rotation quantity or the rotation direction of the second wheel input, and, when the zoom-in or the zoom-out of the three-dimensional image is not possible, display the third user interface further including a function for rotating the three-dimensional image in accordance with the third wheel input.

According to various embodiments of the present disclosure, when a first gesture input is received from the external electronic device after the second input is received, the instructions may be configured to cause the processor 110 to move and display the selected object according to a movement angle or a movement speed indicated by the first gesture input.

According to various embodiments of the present disclosure, when the selected object is located on a second window based on the first gesture input, the instructions may be configured to cause the processor 110 to identify a second user interface for controlling a second application designated to the second window, and display the second user interface on the second window instead of the first user interface.

According to various embodiments of the present disclosure, when a first function among functions of the first application is performed in accordance with the second input, the instructions may be configured to cause the processor 110 to change a size or a color of an indication indicating the first function and display the change indication on the first user interface.

According to various embodiments of the present disclosure, as the electronic device 100 displays an interface which can control a particular application through a wheel input, the user may control functions of various applications displayed on the interface through a gesture input and a wheel input using an external electronic device alone.

Figure 2A:
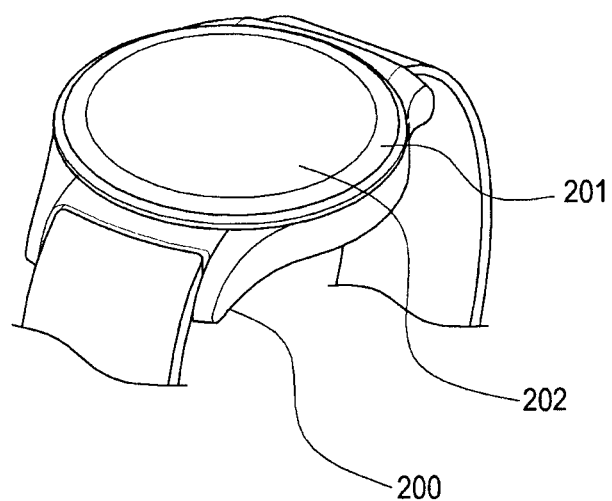
FIG. 2A schematically illustrates a watch-type external electronic device according to various embodiments of the present disclosure.

FIG. 2A schematically illustrates a watch-type external electronic device according to various embodiments of the present disclosure.

Referring to FIG. 2A, an external electronic device 200 may include a body including a wheel dial member 201 in a ring-type structure or a circular display and a band (or a strap) for fixing the body to a user's wrist. The circular display may include a touch screen 202.

According to various embodiments of the present disclosure, although it is described as an example that the external electronic device 200 is the watch-type electronic device, the present disclosure is not limited thereto and the external electronic device 200 can be various types (for example, necklace type) of electronic devices (for example, smart phones and wearable devices) including the wheel dial member 201.

The touch screen 202 may include a touch panel for detecting a touch input and detect a user input (for example, a touch or hovering).

The wheel dial member 201 may be arranged to be ratable around the touch screen 202 in the form of a bezel, and a display of at least one electronic device (for example, the electronic device 100) communication-connected to the external electronic device 200 may be controlled based on a wheel input generated by the rotation of the wheel dial member 201. For example, the control is made such that an object displayed through the display of the electronic device 100 may move or its indication is changed according to a rotation quantity, a rotation direction, or a rotation speed of the wheel input made through the wheel dial member 201.

According to various embodiments of the present disclosure, the wheel dial member 201 may be formed along the circumference of the touch screen 202 and include a physically rotatable ring-type structure. For example, the wheel dial member 201 may rotate in the unit of predetermined rotation angles so that the user feels clicking as the user rotates the wheel.

Figure 2B:
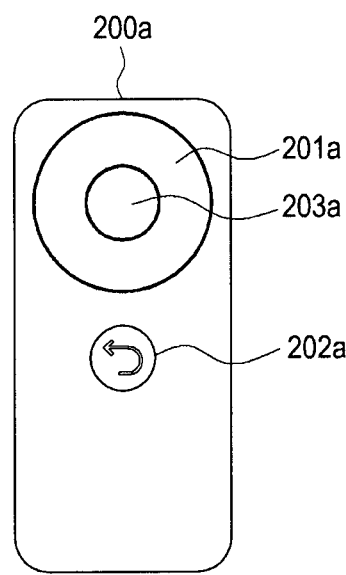
FIG. 2B schematically illustrates a remote controller-type external electronic device according to various embodiments of the present disclosure.

FIG. 2B schematically illustrates a remote controller-type external electronic device according to various embodiments of the present disclosure.

Referring to FIG. 2B, an external electronic device 200*a* may include a wheel scroll button 201*a*, a previous execution button 202*a*, or a touch sensor 203*a*.

The wheel scroll button 201*a* may include a touch screen for detecting a touch input. For example, the wheel scroll button 201*a* may determine the detection of the wheel input based on a rotation speed, a rotation direction, and a rotation quantity of a touch input made through the touch screen.

According to various embodiments of the present disclosure, the external electronic device 200*a* may detect the wheel scroll input made through the wheel scroll button 201*a* as an input for controlling an object displayed on the display of the electronic device 200*a*. For example, although it is described that the wheel scroll button 201*a* is arranged in an upper front port of the body, the wheel scroll button 201a may be arranged at various locations (for example, lateral side or lower portion) at which the user can control the external electronic device 200a through fingers.

According to various embodiments of the present disclosure, the external electronic device 200a may be connected to the electronic device (for example, the electronic device 100) through an electrical connection or wireless communication (for example, short-range wireless communication such as Bluetooth or Wi-Fi) and may transmit the wheel input made through the wheel scroll button 201a to the electronic device.

Figure 3:
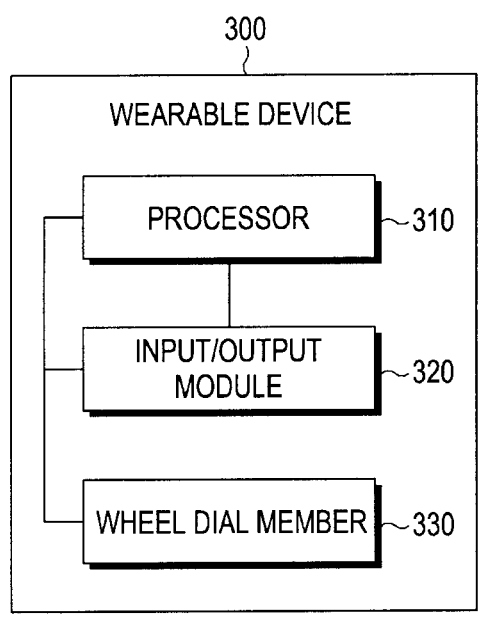
FIG. 3 is a block diagram illustrating an example of a configuration of a wearable device according to various embodiments of the present disclosure.

FIG. 3 is a block diagram illustrating an example of a configuration of a wearable device according to various embodiments of the present disclosure.

Referring to FIG. 3, a wearable device 300 may include a processor 310, an input/output module 320, and a wheel input device (for example, a wheel dial member 330).

According to various embodiments of the present disclosure, the wearable device 300 may be of a type that can be affixed to a user's body (for example, a head, wrist, or neck of the user), but the present disclosure is not limited thereto and the wearable device 300 can be configured in other diverse sizes and forms, such that the user can carry it, hold it, wear it, or otherwise.

The processor 310 may perform general processing operation of the wearable device 300. For example, the control of the wearable device 300 may include inputs such as 'wheel input information' made through rotary input devices such as the wheel input device (for example, the wheel dial member 330 or the wheel scroll button 201a). When such inputs are identified, the wheel input information is converted into information that can be processed by the external electronic device (for example, the electronic device 100), and the converted information is transmitted to the corresponding electronic device.

The input/output module 320 may output data processed by the wearable device 300 to an external device or convert information received from an external device or sensor into data that can be processed by the wearable device 300.

According to various embodiments of the present disclosure, the input/output module 320 may include a communication module for performing short-range wireless communication with at least one external electronic device or at least one sensor. The wheel input made through the wheel dial member 330 may be transmitted to the external electronic device through the communication module.

At least one sensor may include an acceleration sensor, a touch sensor, or a gyroscope, and may detect motion speed, direction, and angle of the wearable device 300 and transmit them to the electronic device.

The wheel dial member 330 may receive user inputs as to rotate in a clockwise direction or a counterclockwise direction, and the input portion may be configured in various forms, including, for example, a touch screen panel, a wheel scroll button, stem of a watch, and a bezel to detect wheel input information. For example, the wheel input information may include data indicating a rotation direction, a rotation speed, or a rotation quantity input through various wheel input devices (for example, the wheel dial member 201, the wheel dial member 330, or the stem or the wheel scroll button 201a).

Hereinafter, an example in which the electronic device (for example, the smart phone) is mounted on the wearable device will be described with reference to FIGS. 4A to 4C.

Figure 4A:
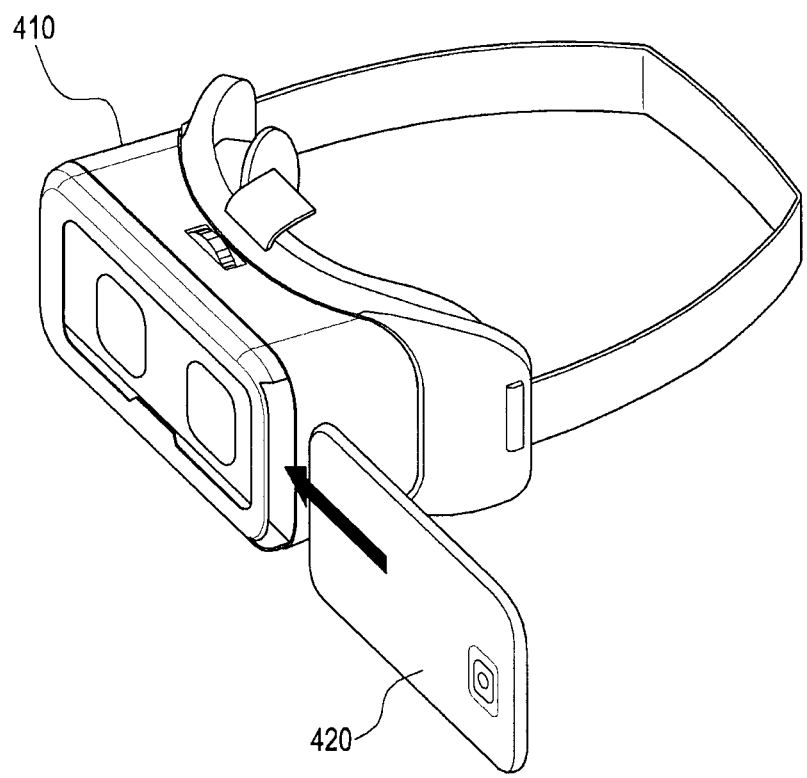
FIG. 4A and FIG. 4B illustrate examples of a wearable device according to various embodiments of the present disclosure.
Figure 4B:
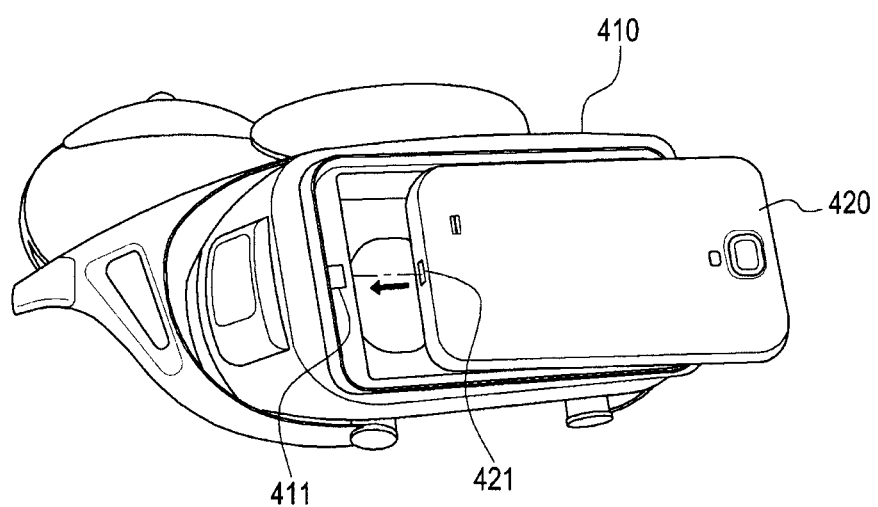

FIGS. 4A and 4B illustrate examples of a wearable device 410 according to various embodiments of the present disclosure.

Figure 13:
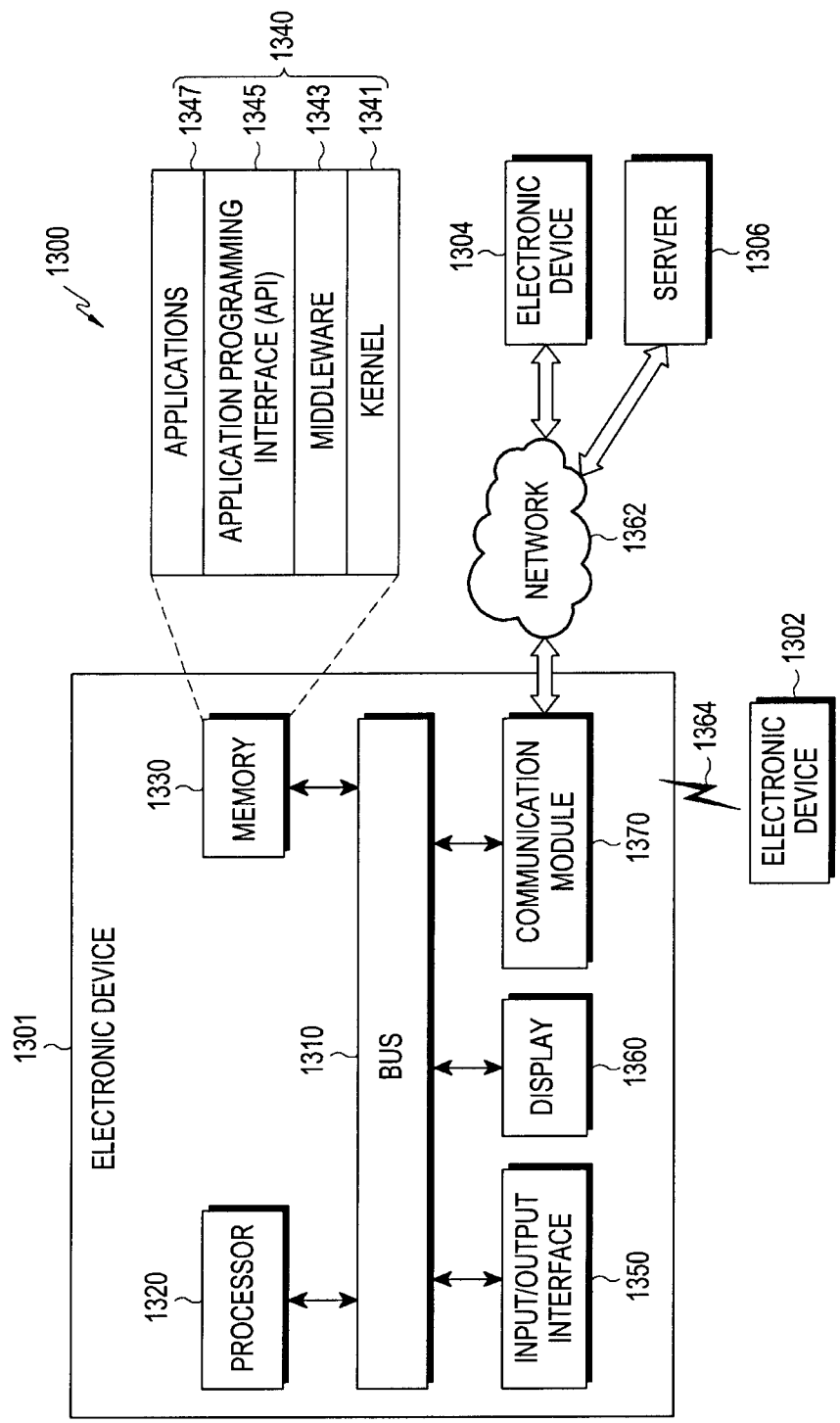
FIG. 13 is a block diagram illustrating an example of a network environment, according to various embodiments of the present disclosure.

Referring to FIGS. 4A and 4B, the wearable device 410 may be, for example, an electronic device 1302 of FIG. 13. Further, as described above, the wearable device 410 may be a simple holder which does not itself communicate electronically with an electronic device 420. The wearable device 410 may include a body and a cover.

Figure 4C:
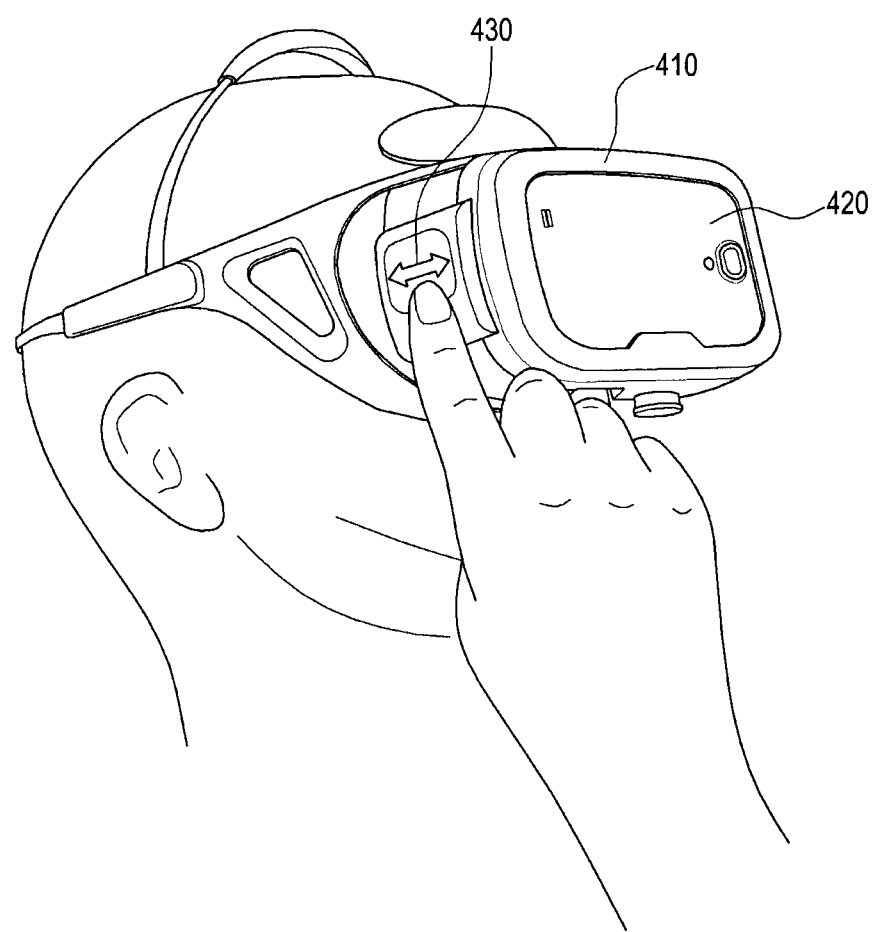
FIG. 4C illustrates an example in which a user wears a wearable device on which an electronic device is mounted according to various embodiments of the present disclosure.

When the electronic device 420 is mounted on the wearable device 410, the aforementioned cover may cover a rear edge of the electronic device 420 so as to be affixed to the wearable device 410, resulting in a mounted state of the electronic device 420, as illustrated in FIGS. 4A to 4C. The wearable device 410 may include a support which can be used to secure the wearable device 410 to a user's head.

Further, a plurality of lenses may be disposed at positions within the wearable device 410 corresponding to the eyes of the wearer. The wearer may therefore view a display (not shown) of the electronic device 420 through the lenses when the electronic device 420 is mounted in the wearable device 410. The wearable device 410 may further have a mechanical fastener by which the electronic device 420 can be securely attached and detached as illustrated in FIGS. 4A to 4C.

According to various embodiments of the present disclosure, the wearable device 410 may include one or more of the components of the electronic device 1301 of FIG. 13. For example, the wearable device 410 may include at least one of a touch panel, a button, a wheel key, and a touch pad. The touch panel may receive a touch input by the user. The touch input may be implemented using a direct contact-based touch input of the user on the touch panel, or a hovering input approaching but not contacting the touch panel. When the electronic device 420 is mounted on the wearable device 410, the wearable device 410 may be able to communicate with the electronic device 420 through an interface such as a USB.

The electronic device 420 may control a function corresponding to an input in response to the input received from the wearable device 410. For example, the electronic device 420 may move or select a displayed object or control a screen (for example, a video reproduction screen in HMD mode) in response to the received input. For example, when the electronic device 420 is mounted on the wearable device 410, an external device connector (not shown) of the electronic device 420 may be electrically connected to a connector (not shown) of the wearable device 410 and communication between the devices becomes possible.

FIG. 4C illustrates an example in which the user wears the wearable device on which the electronic device is mounted according to various embodiments of the present disclosure.

As illustrated in FIG. 4C, the user may control a function of the wearable device 410 or a function of the electronic device 420 through a touch pad 430 provided at the lateral side of the wearable device 410.

Referring to FIGS. 4A to 4C, the electronic device 420 may be the electronic device 100 of FIG. 1, for example, a smart phone including a display means. The wearable device 410 may be the electronic device 100 of FIG. 1 or an external electronic device 1302 or 1304, or a wearable holder acting as a mechanical holder.

The electronic device 420 may be mounted on the wearable device 410 in such a manner that the display unit (for example, the touch screen) of the electronic device 420 faces the user as illustrated in FIGS. 4A to 4C. The user may utilize a cover to cover the wearable device 410 to affix the electronic device 420 to the wearable device 410.

As illustrated in FIG. 4C, the user may wear the wearable device 410 on which the electronic device 420 is mounted. The wearer may view the screen of the display of the mounted electronic device 420 through lenses included in the wearable device 410.

Figure 5:
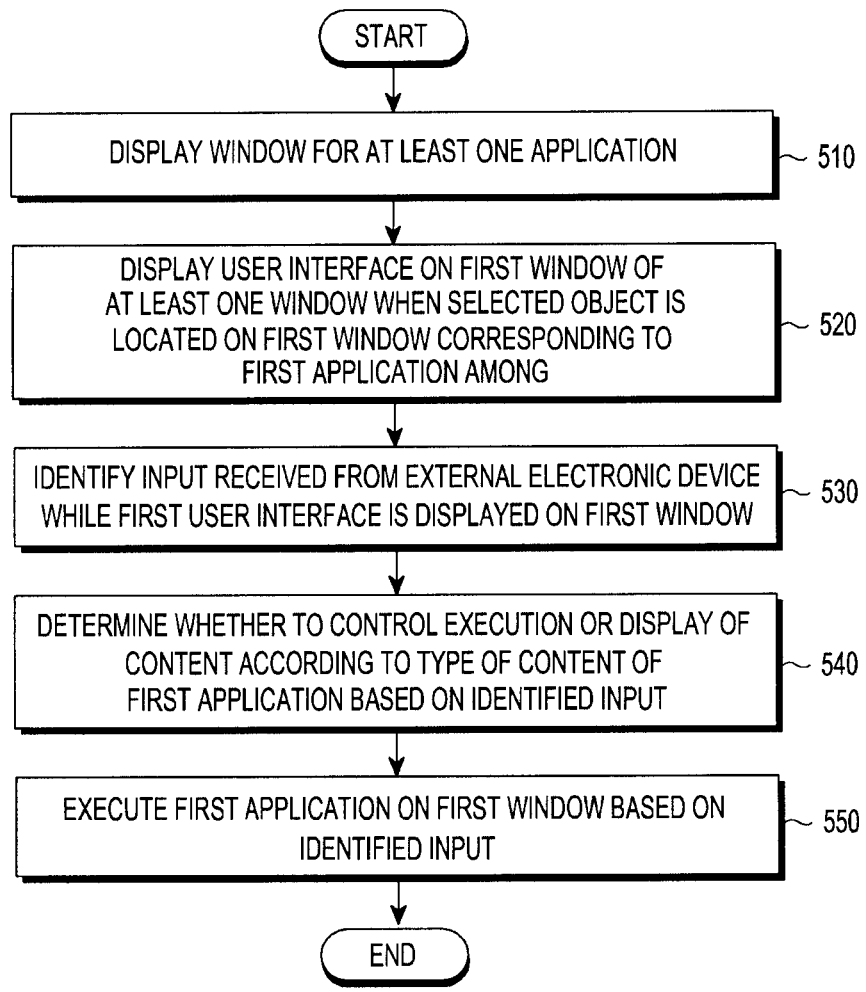
FIG. 5 is a flowchart illustrating an example of the operation of controlling a displayed object in the electronic device according to various embodiments of the present disclosure.

FIG. 5 is a flowchart illustrating an example of the operation of controlling a displayed object in the electronic device according to various embodiments of the present disclosure.

Referring to FIG. 5, in operation 510, the electronic device may display a window for at least one application.

In operation 520, when a selected object is located on a first window corresponding to a first application among at least one window, the electronic device may display a first user interface for controlling the first application on the first window. In operation 530, the electronic device may identify an input received from an external electronic device while the first user interface is displayed on the first window. For example, the input may be a wheel input made through the wheel dial member 201 or 330 (or the wheel scroll button 201a) of the external electronic device.

In operation 540, the electronic device may identify the type of content included in the first application to determine whether to control the execution or the display of the contents based on the received input. For example, when the contents correspond to a list of media files (for example, music or images), the electronic device may "execute" (reproduce) a particular media file in the list based on the received input, and when the contents correspond to a three-dimensional object, the electronic device may cause the three-dimensional object to move, enlarge, or shrink the three-dimensional object based on the received input.

In operation 550, the electronic device may execute the first application on the first window based on the determination according the input received from the external electronic device.

Figure 6:
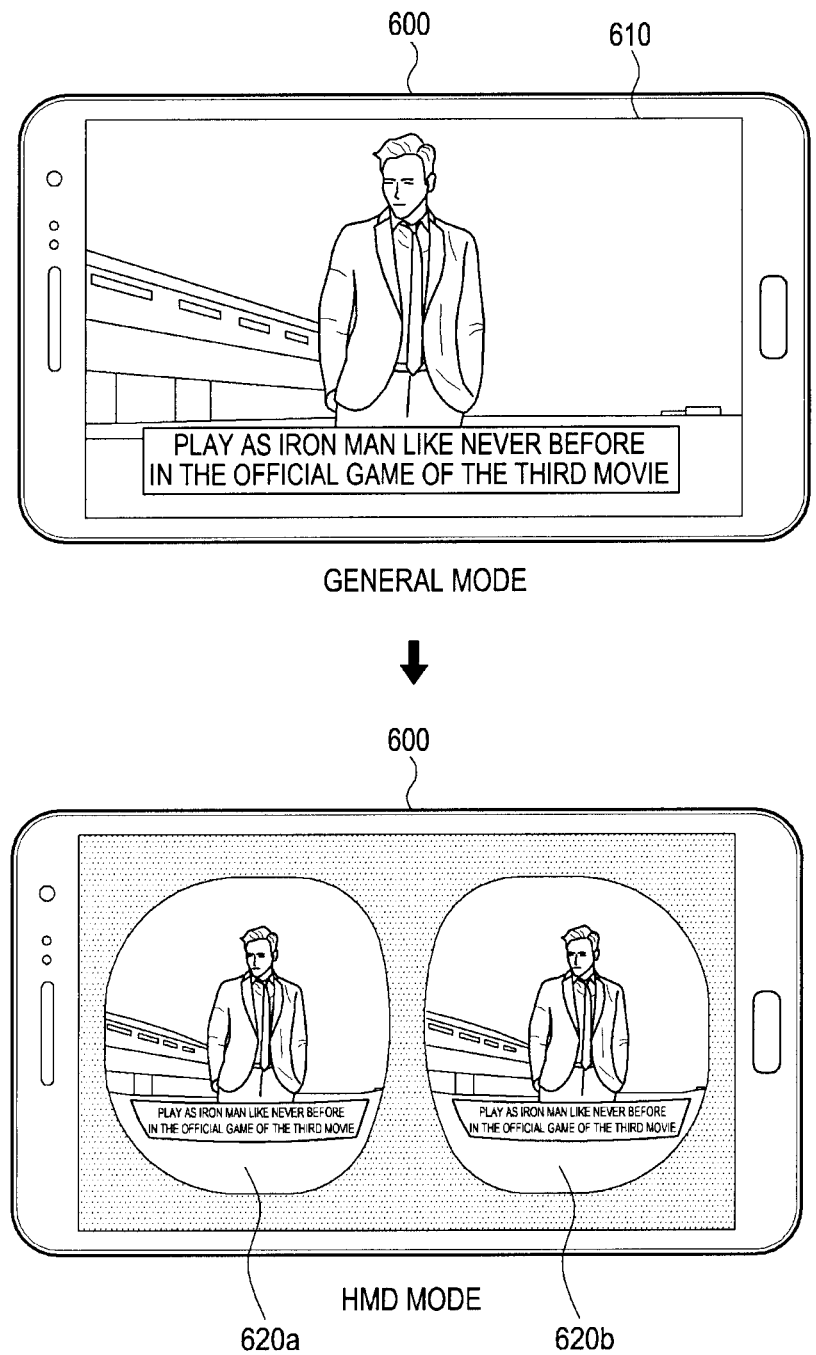
FIG. 6 illustrates a screen mode of the electronic device according to various embodiments of the present disclosure.

FIG. 6 illustrates a screen mode of an electronic device according to various embodiments of the present disclosure.

Referring to FIG. 6, an electronic device 600 may be the electronic device 420 of FIGS. 4A to 4C. When the electronic device 600 operates in a "general" or normal mode, one operation screen 610 may be displayed as illustrated in the upper side of FIG. 6.

According to various embodiments of the present disclosure, when the electronic device 600 is mounted in the wearable device, the electronic device 700 may operate in the "HMD" mode as illustrated in the lower side of FIG. 6. When the electronic device 600 operates in the HMD mode, the electronic device 600 may divide display screens into a screen 620a corresponding to a user's left eye, and a screen 620b corresponding to a user's right eye. That is, in the HMD mode, one image may be divided into and displayed as two images 620a and 620b.

According to various embodiments of the present disclosure, when the electronic device 600 is mounted on the wearable device and operates in the HMD mode, display areas or display locations of the screens (e.g., the screen 620a corresponding to the left eye, and the screen 620b corresponding to the right eye) corresponding to the HMD mode may be determined.

Figure 7:
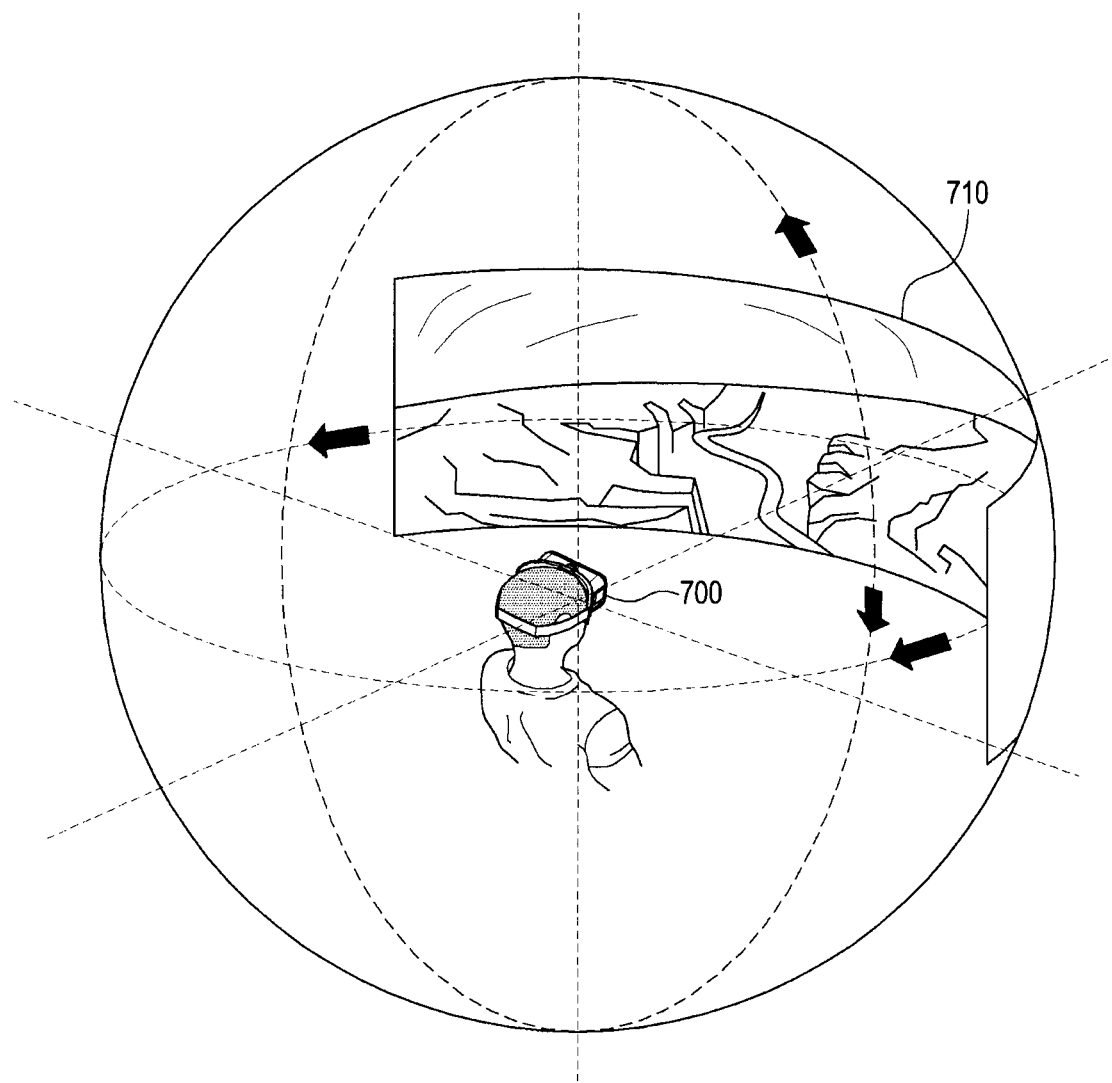
FIG. 7 illustrates an example of a display screen of the electronic device when the electronic device is mounted on a wearable device according to various embodiments of the present disclosure.

FIG. 7 illustrates an example of a display screen of an electronic device when the electronic device is mounted on a wearable device according to various embodiments of the present disclosure.

Referring to FIG. 7, the user may wear a wearable device 700 in which the electronic device 700 is mounted. Accordingly, an HMD mode screen 710 may be output to a display of the electronic device 700.

According to various embodiments of the present disclosure, the HMD mode screen 710 facilitates generation of a display screen including a three-dimensional image. Objects located at positions corresponding to a movement of the electronic device 700 may be output through the electronic device 700 among objects on the HMD mode screen 710. For example, when the user's head faces upward, the electronic device 700 may also move upward and alter display to a screen representing objects in an upper area of the HMD mode screen 710, based on a relative reference location.

According to various embodiments of the present disclosure, it is described that the selected object is controlled according to the movement of the electronic device 700 when the selected object is output on the HMD mode screen 710, but the selected object may be moved or selected based on a wheel input and a gesture input received from an external electronic device functionally connected to the electronic device 700 and various user interfaces may be displayed according to a window on which the selected object is located.

Figure 8A:
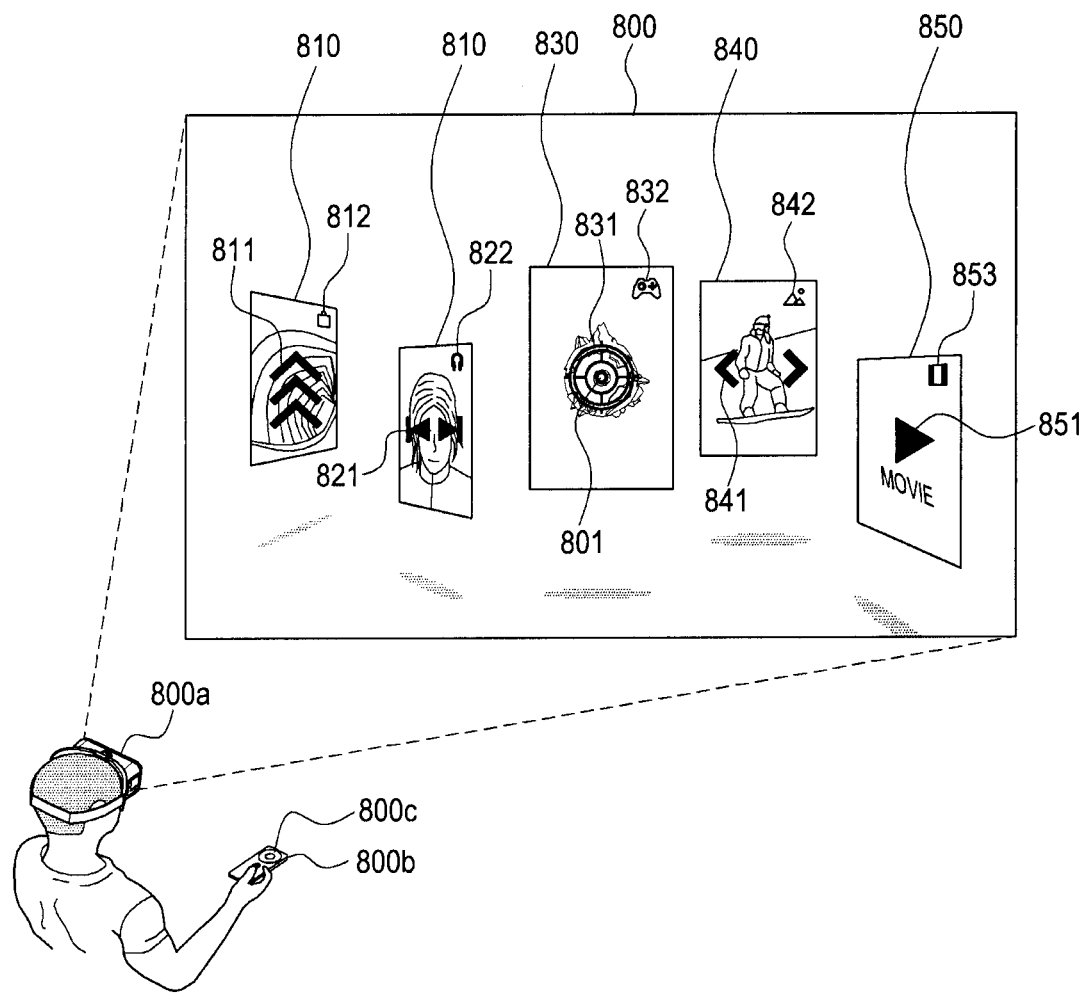
Figure 8C:
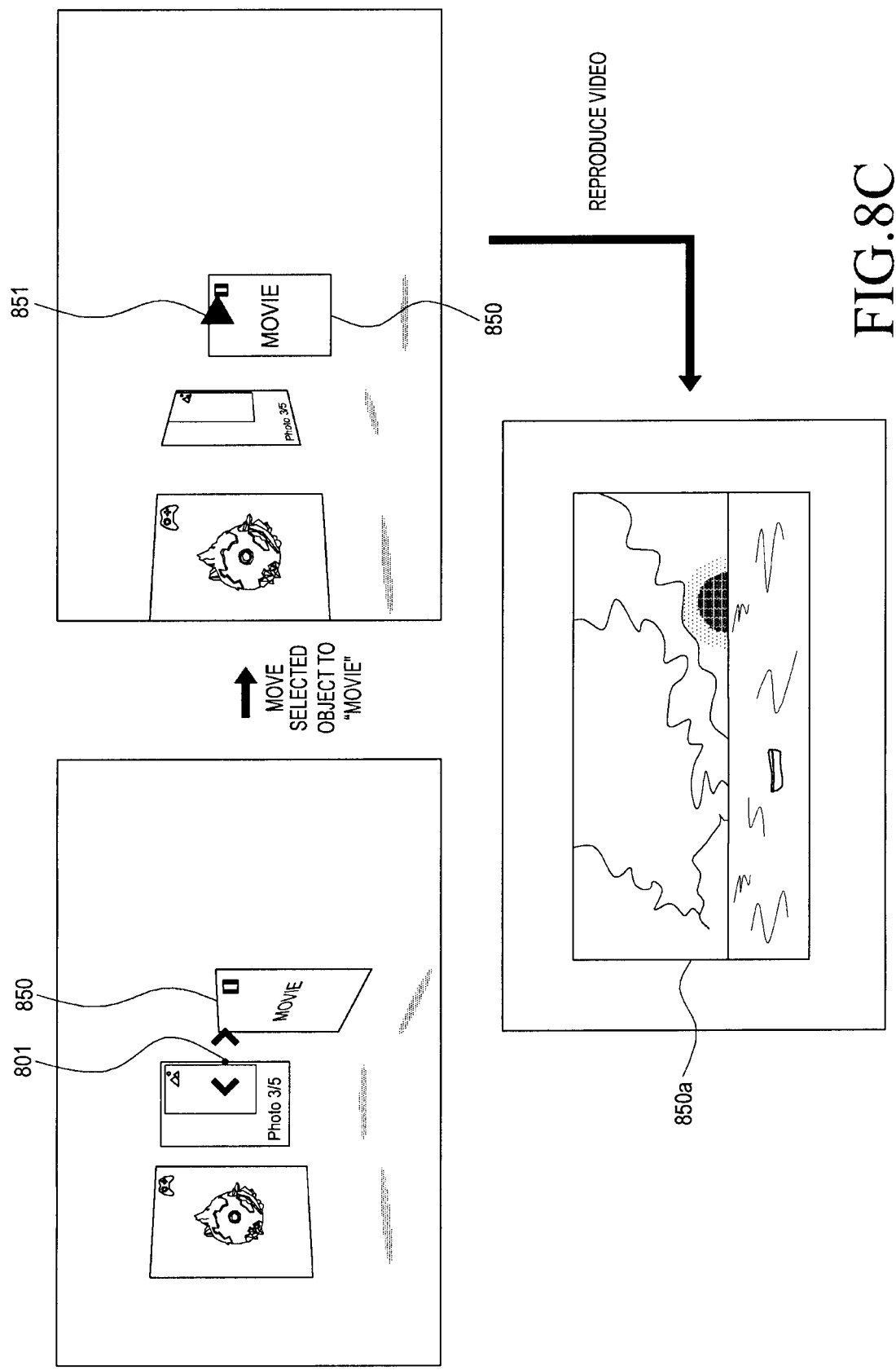

FIGS. 8A to 8C illustrate various examples of a display screen including objects controlled by a wheel input according to various embodiments of the present disclosure.

According to various embodiments of the present disclosure, an electronic device 800a may be mounted on and functionally connected to a wearable device, or may be a wearable device including a display device.

Referring to FIG. 8A, an electronic device 800a functionally connected to an external electronic device 800b detects a wheel input (e.g., rotary). In response, the electronic device 800a may set at least one window through a display screen 800, and display a presently selected object 801. The external electronic device 800b may include a wheel dial member 800c and transmit a wheel input detected through the wheel dial member 800c to the electronic device 800a.

Screens (for example, 810 to 850) of designated applications or contents and indications (for example, 812, 822, 832, 842, and 852) indicating types of the designated applications or contents may be displayed within at least one window. For example, execution screen 810 may correspond to an application market, and include an indicator 812 indicating the type of application. A reproduction screen 820 of music content may include an indicator 822 indicating that the type of content is music (or a music list) may be included in a second window. A preview screen 830 of a three-dimensional image may include an indication 832 indicating that the type of content is a game or a three-dimensional image. A screen 840 of image content may include an indication 842 indicating that the type of content is an image (or an image list). A reproduction screen 850 of a video may include an indication 853 indicating that the type of content is a video.

According to various embodiments of the present disclosure, when the selected object 801 moves according to the input received from the external electronic device, the electronic device may identify a window that overlaps the selected object 801 among at least one window. For example, the electronic device may identify types of applications and contents designated to the window that overlaps the selected object 801 and display a user interface on the corresponding window.

The type of application may include media (for example, music, photos, and videos), a reproduction application, a contact application, a messaging application, a camera application, an application market, or a three-dimensional output application. The type of content may include music content, image, videos, or three-dimensional images.

The user interface according to various embodiments of the present disclosure may include a previous/next music reproduction interface 821, a previous/next photo reproduction interface 841, a media file reproduction interface 851, an interface for searching for a scene, an interface 811 for displaying application categories of the application market, and an interface for displaying an enlarged/reduced three-dimensional image.

According to various embodiments of the present disclosure, although it is described that a plurality of interfaces are displayed on a plurality of windows in the display screen 800 according to various embodiments of the present disclosure, the present disclosure is not limited thereto and a particular interface may be displayed according to a location of the selected object 801. For example, as the selected object 801 is located on the third window designated to the three-dimensional image output application, a three-dimensional image display interface 831 associated with the execution of the three-dimensional image output application may be output.

Referring to FIG. 8B, when the fourth window is the selected object 801 which is the photo reproduction application, the electronic device may output a predetermined photo within the fourth window, and display the previous/next photo reproduction interface 841 for controlling navigation of the photos.

According to various embodiments of the present disclosure, when a wheel input is received from the external electronic device when the previous/next photo reproduction interface 841 is displayed, the previous/next photo reproduction interface 841 may be controlled in accordance with the received wheel input. For example, the previous/next photo reproduction interface 841 may include a previous file display button 841*a* and a next file display button 841*b*, causing either a previous or next file to be displayed.

According to various embodiments of the present disclosure, when the received wheel input indicates a rotation in a right direction, the electronic device may perform control to scroll and display a next image 840*b* of the image displayed on the fourth window in response to the wheel input in the right direction.

According to various embodiments of the present disclosure, the previous/next photo reproduction interface 841 may be controlled in accordance with the received wheel input in the state in which the previous/next photo reproduction interface 841 is displayed. For example, when the wheel input indicates a wheel input of a particular number of times (for example, two times) in a right direction, the electronic device may determine that the next file display button 841*b* is selected by the number of times, and perform control to display a photo 840*a* corresponding the corresponding number of times on the fourth window.

According to various embodiments of the present disclosure, when the received wheel input indicates a rotation in a left direction, the electronic device may perform control to display a previous image 840*c* of an image 840*d* currently displayed on the fourth window in accordance with the wheel input in the left direction. For example, the image displayed on the fourth window is connected to the previous and next images thereof, and may be scrolled and displayed in the left direction according to the wheel input. Further, a color or a size of the button (for example, the previous file display button 841*a*) of the previous/next photo reproduction interface 841 corresponding to the wheel input in the left direction may be changed and thus the state indicating the controlled interface according to the received wheel input may be displayed.

Referring to FIG. 8C, when a second wheel input is received from the external electronic device while the previous/next photo reproduction interface 841 displayed as the selected object 801 on the fourth window, the electronic device may switch the selected object 801 according to the wheel input. For example, the selected object 801 may transition to the fifth window 850 designated indicating a video file, switching away from the fourth window designating the photo reproduction application responsive to the received second wheel input.

According to various embodiments of the present disclosure, as a predetermined input (for example, a touch or a gesture input) from the external electronic device is detected, the electronic device may control the selected object 801 to transition or switch between objects, based on the gesture input received from the external electronic device. For example, when the selected object 801 moves, the selected object 801 may be moved and displayed in a state of a combination with the previously displayed interface (for example, the previous/next photo reproduction interface 841).

According to various embodiments of the present disclosure, when the selected object 801 is located on the fifth window 850, the electronic device may reproduce and display a media file reproduction interface 851 and a preview image 850 of a video file on the fifth window according to the type of content (for example, the video file) designated to the fifth window.

According to various embodiments of the present disclosure, when a predetermined wheel input is received from the external electronic device while the media file reproduction interface 851 is displayed, the electronic device may switch the display screen 800 to a playback (e.g., reproduction) screen 850*a* of the video file, and output the playback screen 850*a*.

FIG. 9 illustrates an example of controlling a display object according to a wheel input of an external electronic device when an application is executed according to various embodiments of the present disclosure.

According to various embodiments of the present disclosure, when the electronic device executes a media file reproduction application, a playback screen of the corresponding video (for example, 850*a* of FIG. 8C) may be displayed. When a predetermined wheel input from the external electronic device is received while the playback screen is displaying, the electronic device may switch the reproduction screen (for example, 850*a*) to a search screen of an interface 900, which is further controllable by wheel inputs received from the external electronic device.

Referring to FIG. 9, the interface 900 includes a scene search interface 900, an indicator 901 indicating a playback position in the video, media file length information 902, and a preview image of the content of the video (for example, 911 and 912) at the playback position indicated by the indicator 901.

According to various embodiments of the present disclosure, responsive to wheel input received from the external electronic device, the electronic device may move the indicator 901 to a location corresponding to the wheel input. For example, as the wheel input is received the indicator 901 may move as the indicated playback position (for example, "00:49") 903 moves in relation to the wheel input and the preview image 912 at the corresponding point may be enlarged or moved upwards and displayed in distinction from the representation of the rest of the video file.

According to various embodiments of the present disclosure, when a predetermined input (for example, a touch input) is received from the external electronic device or a predetermined time passes in the state in which the indicator 901 of the interface 900 indicates the particular point (for example, "00:49"), the electronic device may switch the screen of the interface 900 to a reproduction screen 913 of the media file and reproduce the media file. For example, when the predetermined input is received, the electronic device may reproduce the media file through the reproduction screen 913, starting from the point (for example, "00:49") indicated by the indicator 901.

Figure 10A:
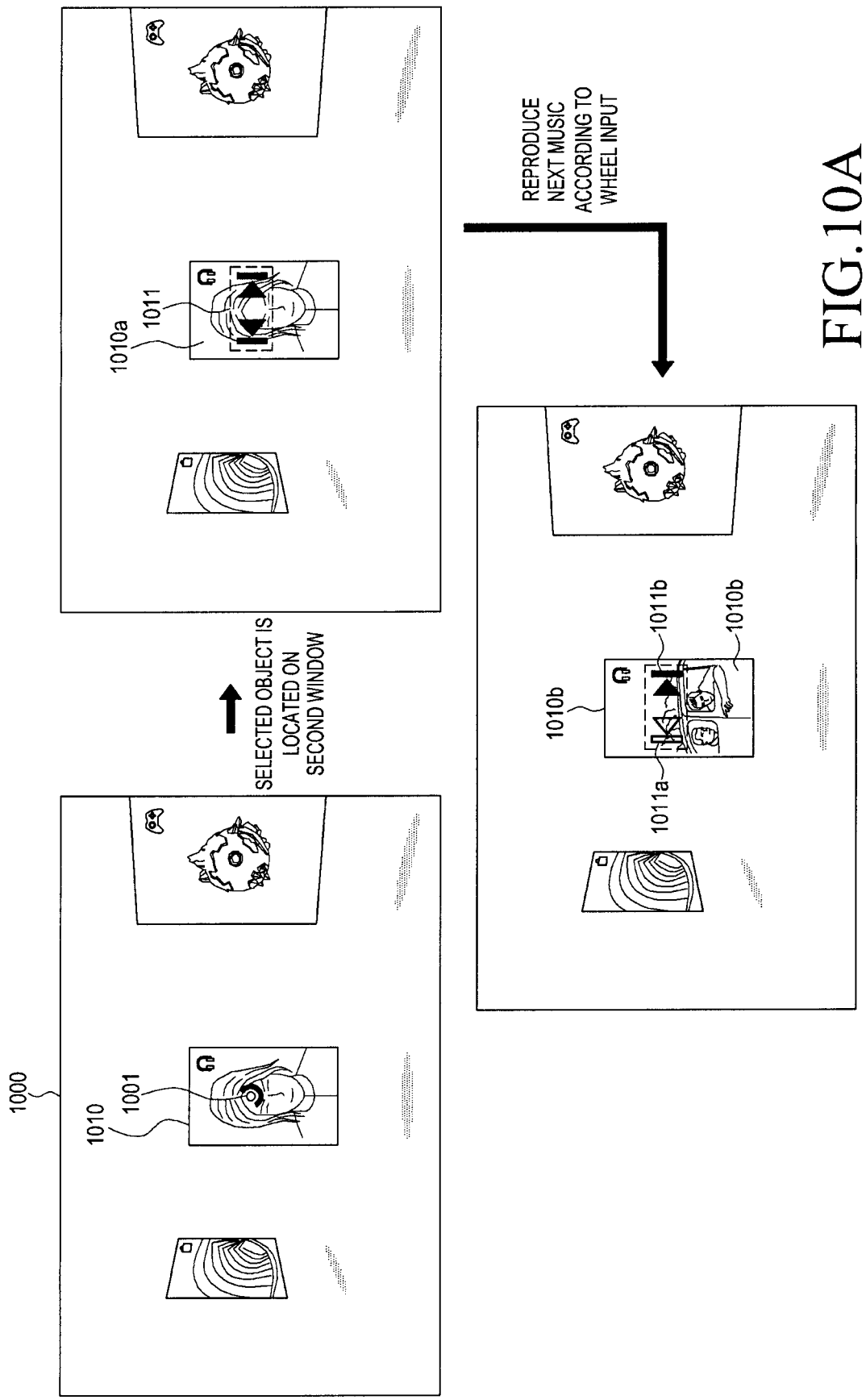
FIG. 10A and FIG. 10B illustrate various examples in which the electronic device controls displayed objects according to a wheel input of an external electronic device according to various embodiments of the present disclosure.
Figure 10B:
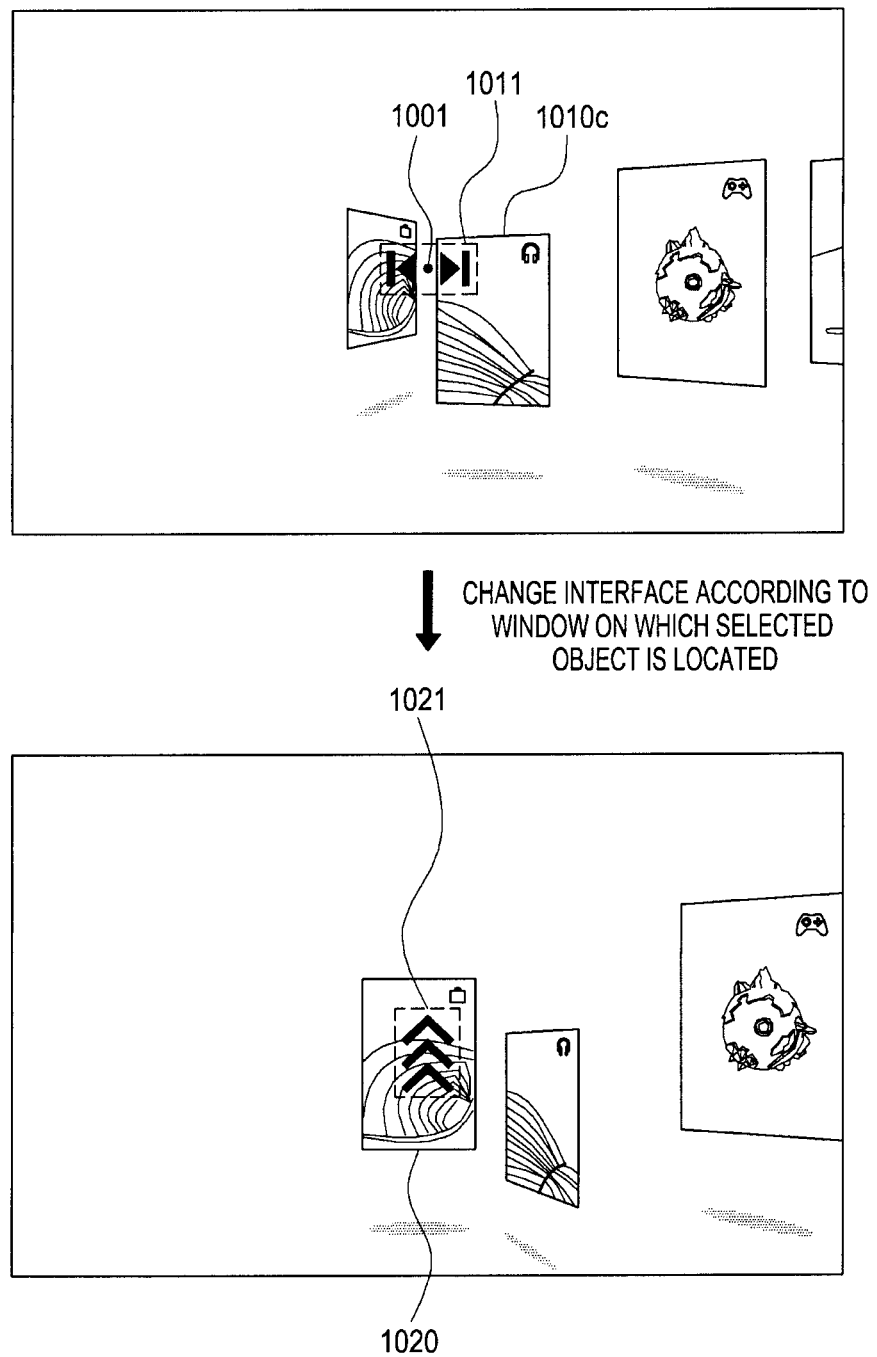

FIGS. 10A and 10B illustrate various examples in which the electronic device controls a displayed object according to a wheel input of an external electronic device according to various embodiments of the present disclosure.

Referring to FIG. 10A, on a display screen 1000 of the electronic device, at least one window and a selected object 1001 that moves according to an input (for example, a gesture input) received from the external electronic device may be displayed.

According to various embodiments of the present disclosure, as the selected object 1001 indicate selection of a first window 1010, the electronic device may identify an interface that facilitates control of the application or content displayed within the first window 1010. For example, when a music reproduction application is displayed within the first window 1010, the electronic device may display a music reproduction screen (for example, 1010a or 1010b) and a music reproduction interface 1011 on the first window 1010.

According to various embodiments of the present disclosure, the music reproduction screen may include album photos and singer images of the currently reproduced music, and the music reproduction interface 1011 may include a previous music reproduction button 1011a or a next music reproduction button 1011b. For example, when a rotation direction of the wheel input received from the external electronic device is a left direction, the electronic device may determine that the previous music reproduction button 1011a is selected. When the rotation direction of the wheel input is a right direction, the electronic device may determine that the next music reproduction button 1011b is selected.

According to various embodiments of the present disclosure, when the electronic device identifies that the music reproduction interface 1011 is displayed on the first window 1010, the electronic device may execute a music reproduction application on the first window 1010. For example, the electronic device may reproduce predetermined music and display an album image 1010a of the reproduced music in an area of the first window 1010.

According to various embodiments of the present disclosure, the electronic device may perform an operation set in the music reproduction interface 1011 according to the wheel input received from the external electronic device while the music reproduction interface 1011 is displayed. For example, as the direction of the wheel input received while the music reproduction interface 1011 is displayed indicates the right direction, the electronic device may perform an operation (for example, next music reproduction) designated to the next music reproduction button 1011b.

Referring to FIG. 10B, when a gesture input is received from the external electronic device, the electronic device may transition the selected object 1011 based on the received input. For example, as seen in FIG. 10B, the selected object 1001 may transition according to the gesture input using a display effect that includes combination with the interface object 1011 displayed on previously located window 1010c.

According to various embodiments of the present disclosure, as the selected object 1001 is located on the second window 1020, the electronic device may switch the interface object 101 to an interface 1020 for controlling an application designated to the second window 1020 on the second window 1020. For example, as an application market is designated to the second window 1020, the interface may include a function of moving the screen to a category for dividing applications or to a particular application.

According to various embodiments of the present disclosure, when a predetermined time passes while the selected object 1001 is located on the second window 1020, the electronic device may display a screen 1100 of the application market.

Figure 11A:
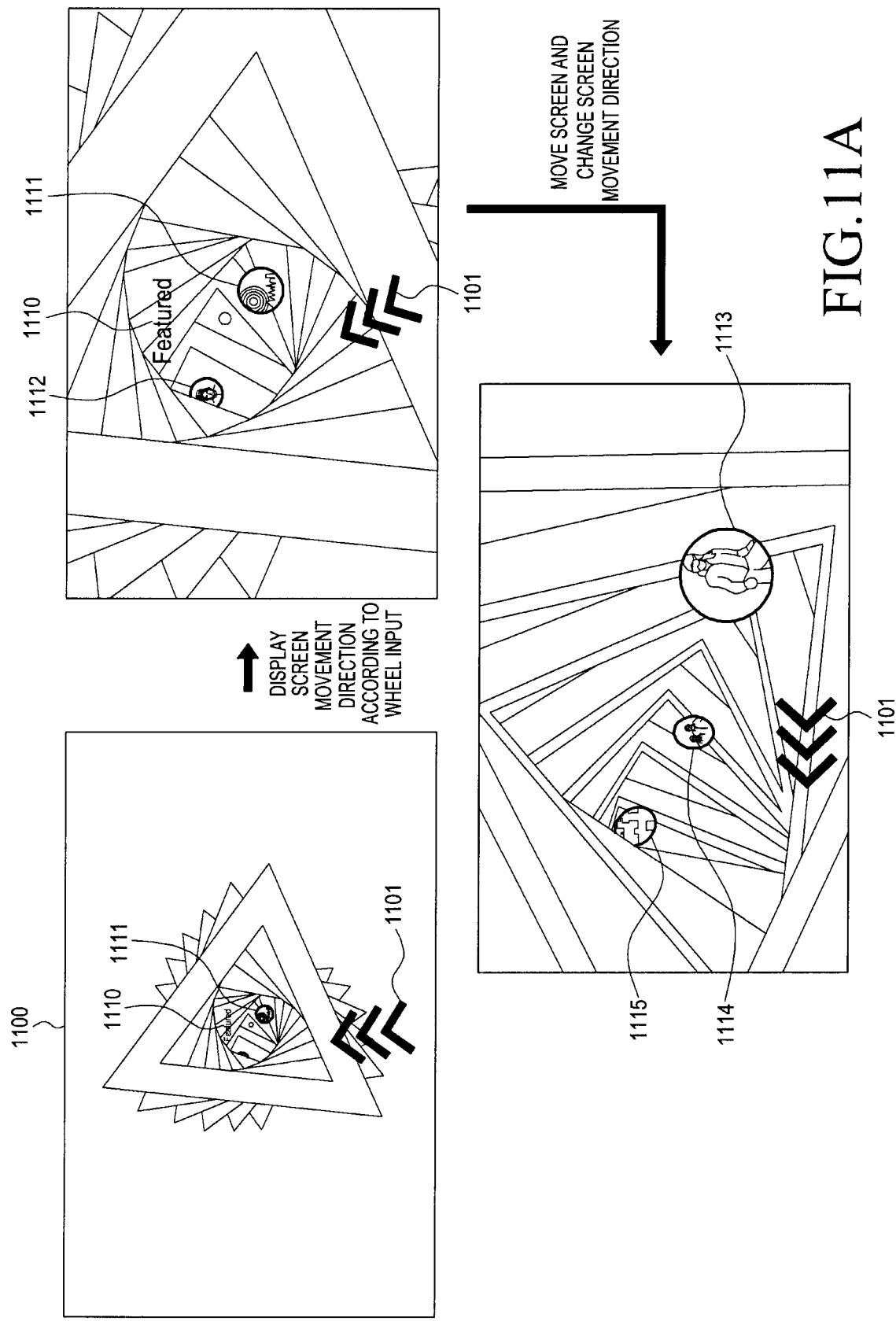
FIG. 11A and FIG. 11B illustrate various examples in which the electronic device moves a screen according to a wheel input of an external electronic device according to various embodiments of the present disclosure.
Figure 11B:
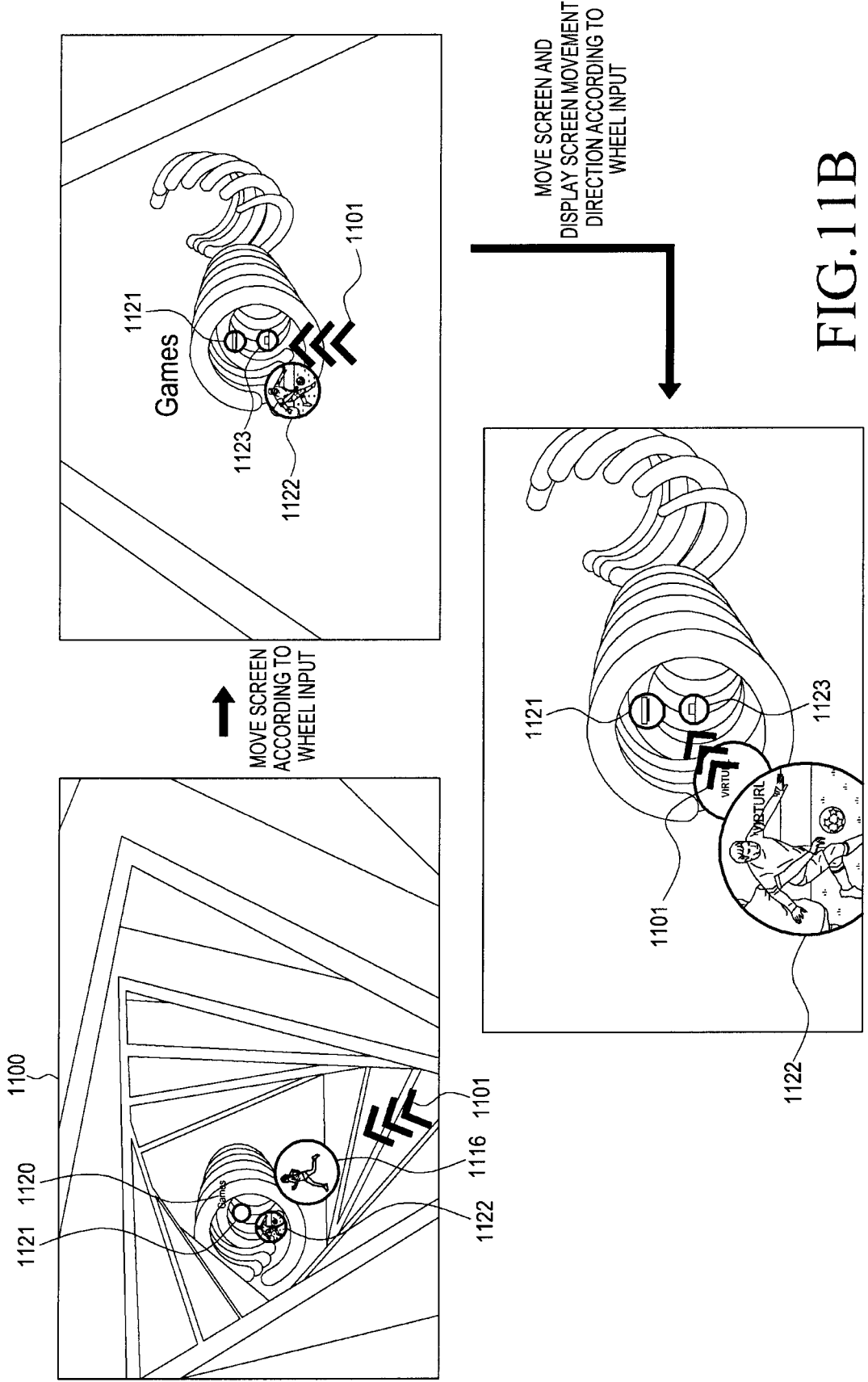

FIGS. 11A and 11B illustrate various examples in which the electronic device moves a screen according to a wheel input of an external electronic device according to various embodiments of the present disclosure.

According to various embodiments of the present disclosure, as a predetermined time passes while the selected object (for example, 1001) is located on the window to which the application market is designated, the electronic device may display a screen 1100 of the application market.

Referring to FIG. 11A, according to various embodiments of the present disclosure, the screen 1100 of the application market may display applications (for example, 1111) classified in a particular category (for example, main applications ("featured") 1110) from among a number of diverse categories, and an interface 1101 characterized by simulated three-dimensional movement within a virtual environment based on the wheel input from the external electronic device. For example, the category may further include a game ("games") 1120, a camera, entertainment, and education, and also various references for classifying other applications.

According to various embodiments of the present disclosure, the interface 1101 may indicate the movement direction of the screen by pointing to a particular direction using arrows images of icons, and control rendering as to simulate movement in the desired direction indicated by the arrows, responsive to the wheel input received from the external electronic device.

According to various embodiments of the present disclosure, when a first wheel input is received from the external electronic device when the interface 1101 is displayed on the screen 1100 of the application market, the screen 1100 of the application market may simulate corresponding movement through the simulated environment in the direction indicated by the interface 1101. For example, as movement is simulated through the environment, the applications (for example, 1111) classified as the main applications ("featured") 1110 may be relatively 'enlarged' as they approach the user's simulated position, and other objects (for example, 1112) may appear and be enlarged as they enter the field of view and approach the user's position through the simulated movement.

According to various embodiments of the present disclosure, when a second wheel input is received from the external electronic device when the interface 1101 is displayed after the first wheel input is received, the screen may be moved in the direction (for example, a direction of 11 o'clock) indicated by the interface 1101 in accordance with a rotation quantity indicated by the second wheel input. For example, on the screen moved according to the second wheel input, objects (for example, 1113, 1114, and 1115) arranged on the screen moved in the direction of 11 o'clock among the applications classified as the main applications 1110 may be further displayed.

According to various embodiments of the present disclosure, applications classified based on the category may be listed and displayed in various forms (for example, a conch shape or a cylindrical shape). For example, the electronic device may display the interface 1101 for displaying a screen movement direction to indicate movement of the screen according to the form in which the applications are arranged.

Referring to FIG. 11B, as movement through the simulated environment continues based on the wheel input received from the external electronic device, applications of another category different from the previous category may come into view on the screen 1100 of the application market.

According to various embodiments of the present disclosure, as the wheel input is received from the external electronic device, the movement may continue up to the last application 1116 of the applications classified as the main applications 1110, and, as movement continues, some of the applications coming into view and classified as another category (for example, a game 1120) may be displayed.

According to various embodiments of the present disclosure, when a first wheel input is received from the external electronic device in the state in which the interface object 1011 displayed on the screen 1100 of the application market points to the particular direction (for example, the direction of 11 o'clock), movement may continue in an 11 o'clock direction, in accordance with the rotation quantity indicated by the first wheel input. For example, on the screen moved according to the first wheel input, applications (for example, 1121, 1122, and 1123) classified as the game 1120 may be arranged and displayed in a simulated three dimensional cylindrical arrangement.

According to various embodiments of the present disclosure, the application market displayed in the screen 1100 may be traversed in the direction indicated by the interface 1101 (for example, a vertical direction of the screen) according to a second wheel input received from the external electronic device after the first wheel input is input. For example, on the screen moved according to the second wheel input, the applications (for example, 1121, 1122, and 1123) classified as the game 1120 may be enlarged and displayed, compared to the screen moved according to the first wheel input.

FIGS. 12A to 12D illustrate an example in which the electronic device displays a three-dimensional image according to a wheel input of an external electronic device according to various embodiments of the present disclosure.

Figure 12A:
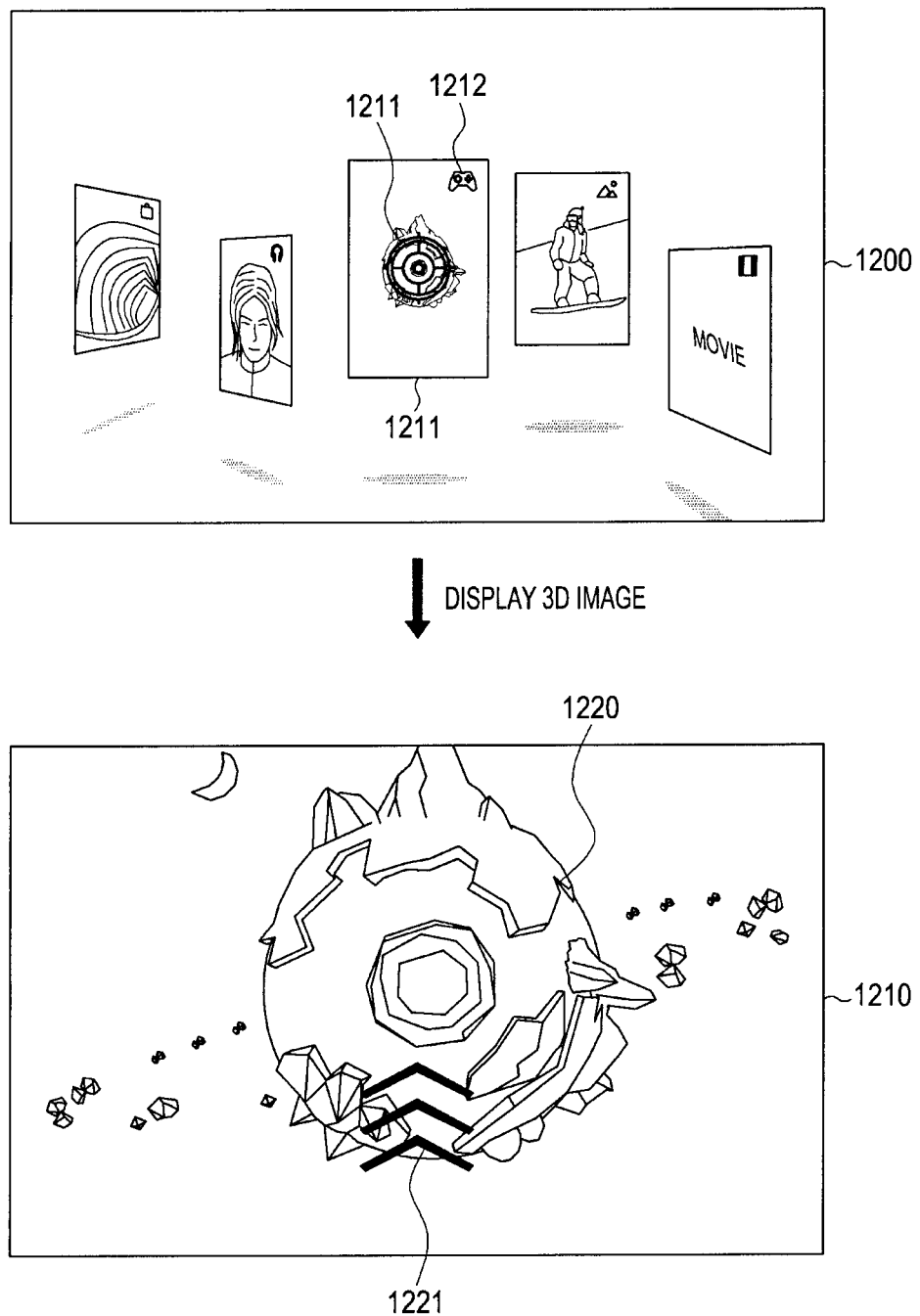
FIG. 12A illustrates an example in which the electronic device displays a three-dimensional image according to a wheel input of an external electronic device according to various embodiments of the present disclosure.

Referring to FIG. 12A, when it is determined that a selected object is located in an area of a particular window 1211 on a display screen 1200 of the electronic device, the electronic device may identify an application or a content designated to the window 1211 and display an interface on the window 1211.

According to various embodiments of the present disclosure, when a three-dimensional image content is designated to the window 1211, the electronic device may display an interface 1201 for displaying a screen of the three-dimensional image content on the window 1211, responsive the wheel input received from the external electronic device. For example, when a wheel input including a predetermined number of rotations s is received from the external electronic device, the display screen 1200 may switch to a full-screen display screen 1210 of the three-dimensional image.

According to various embodiments of the present disclosure, the screen 1210 of the three-dimensional image may display an image object 1220 output in three-dimensions and an interface 1221 for controlling the displaying of the image object 1220 according to the wheel input. For example, the interface 1221 may include a zoom in/out button 1221 for zooming in/out the image object 1220, a zoom in/out state display indication 1222 indicating zoom in/out possibility, or an object rotation button 1223 for rotating the image object 1220 in left and right directions.

Figure 12B:
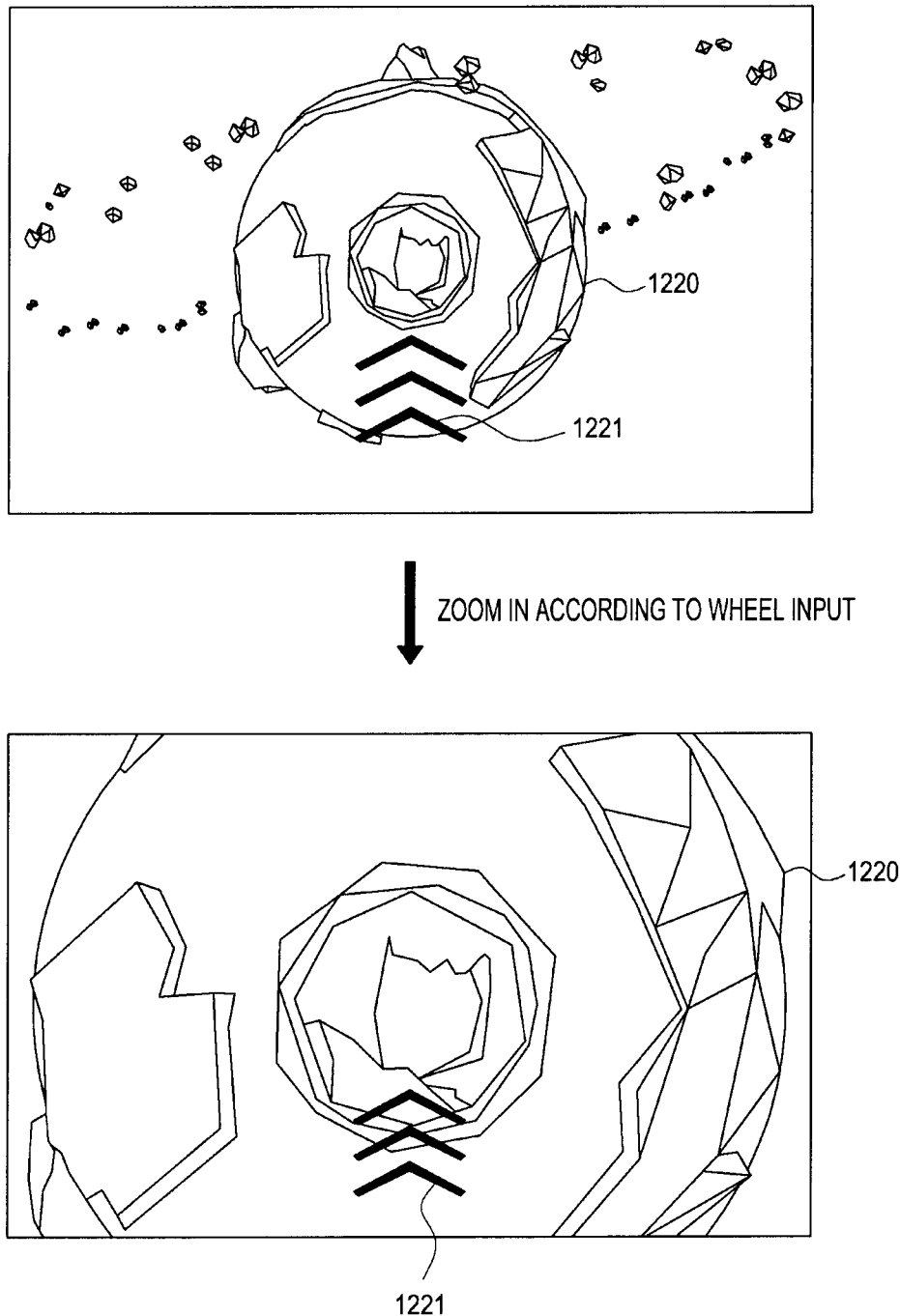
FIG. 12B and FIG. 12C illustrate various examples in which the electronic device enlarges or reduces and displays the three-dimensional image object according to the wheel input of the external electronic device according to various embodiments of the present disclosure.
Figure 12C:
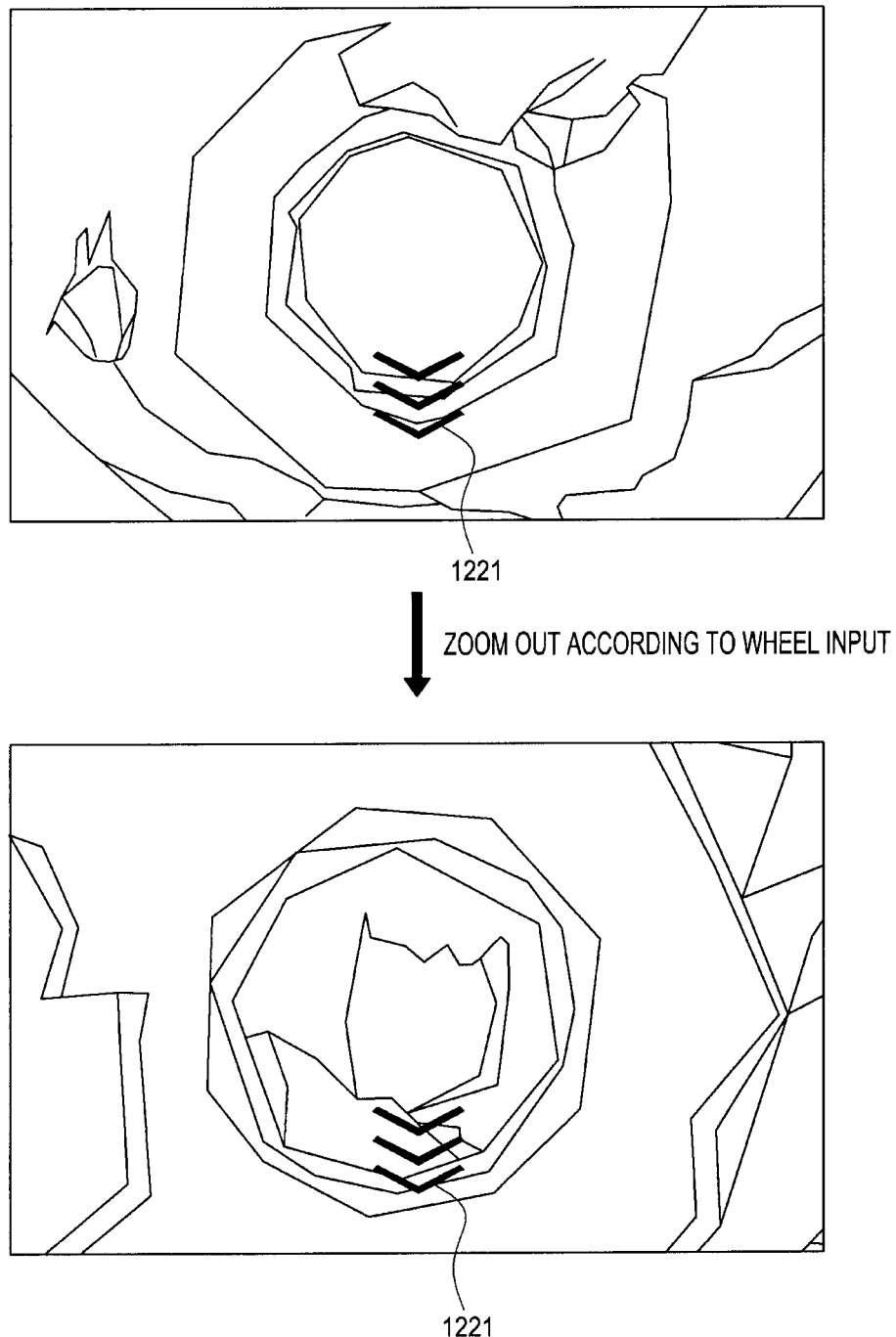

FIGS. 12B and 12C illustrate various examples in which the electronic device enlarges or reduces and displays the three-dimensional image object according to the wheel input of the external electronic device according to various embodiments of the present disclosure.

According to various embodiments of the present disclosure, the screen 1210 of the three-dimensional image may be displayed while including the three-dimensional image object 1220 and the zoom in/out button 1221. For example, the zoom in/out button 1221 may indicate whether to zoom in or out the three-dimensional image object 1220 through a direction of arrows.

Referring to FIG. 12B, while zoom-in of the three-dimensional image object 1220 is possible, the electronic device may display directional arrows facing upwards to indicate the capability. For example, when a first wheel input is received from the external electronic device while the arrows of the zoom in/out button 1221 face upwards, the electronic device may zoom in the three-dimensional image object 1220 in accordance with the rotation quantity of the first wheel input.

According to various embodiments of the present disclosure, the first wheel input is a rotation input in a right direction, and when a wheel input in a left direction is received in the state in which the arrows of the zoom in/out button 1221 face upward, the electronic device may zoom out and display the three-dimensional image object 1220.

Referring to FIG. 12C, when the zoom out of the three-dimensional image object 1220 is possible, the electronic device may display the directional arrows facing downwards. For example, when a second wheel input is received from the external electronic device in the state in which the arrows of the zoom in/output button 1221 facing downward, the electronic device may zoom out the three-dimensional image object 1220 in accordance with the rotation quantity of the second wheel input.

According to various embodiments of the present disclosure, the second wheel input is a rotation input in a right direction, and when a wheel input in a left direction is received in the state in which the arrows of the zoom in/out button 1221 face downward, the electronic device may zoom in and display the three-dimensional image object 1220.

Figure 12D:
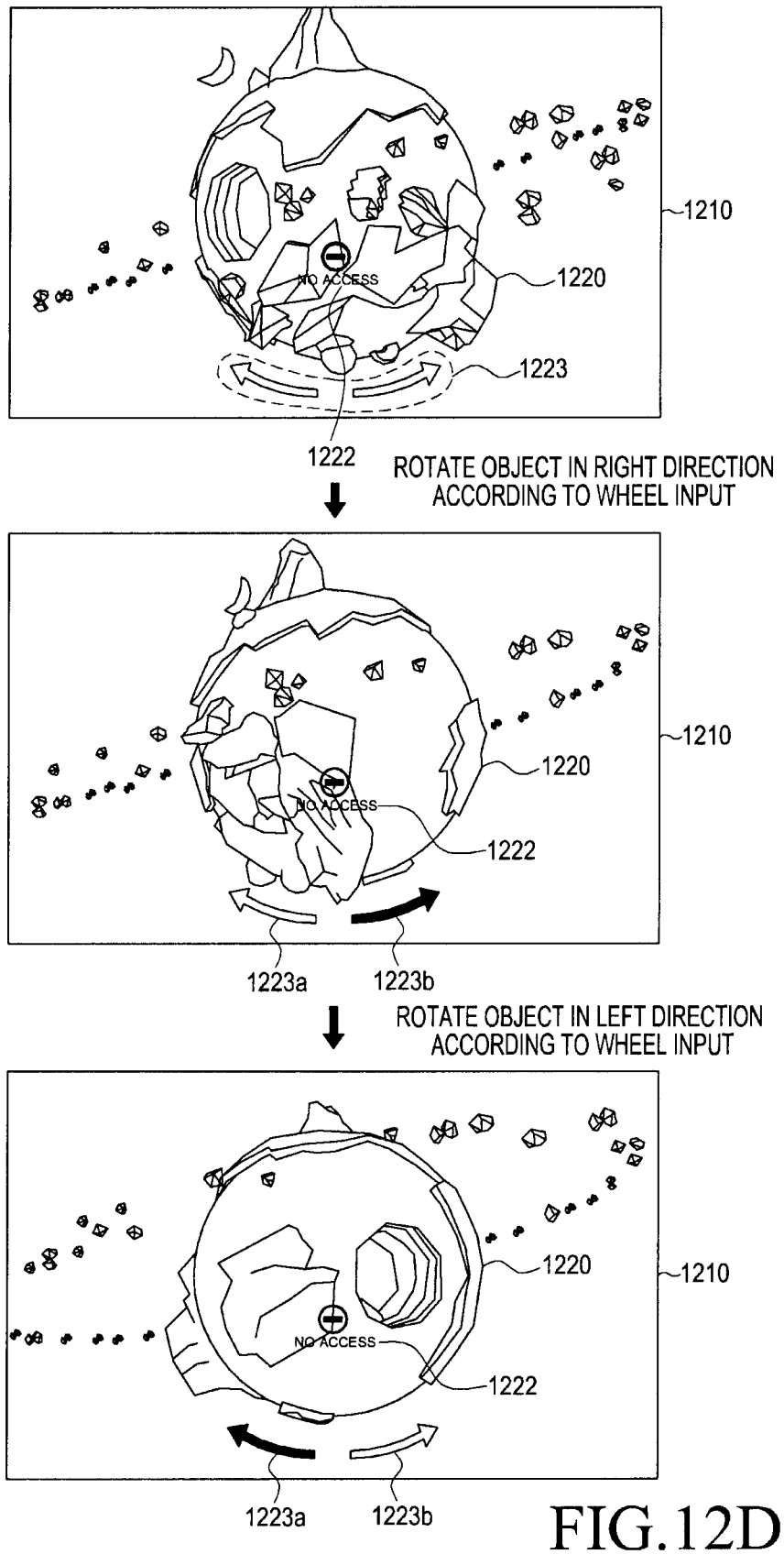
FIG. 12D illustrates an example in which the electronic device moves and displays the image object according to the wheel input of the external electronic device according to various embodiments of the present disclosure.

FIG. 12D illustrates an example in which the electronic device displays movement of the image object according to the wheel input of the external electronic device according to various embodiments of the present disclosure.

Referring to FIG. 12D, the screen 1210 may be displayed while including the three-dimensional image object 1220 with the zoom in/out state indication 1222. For example, the zoom in/out state indication 1222 may include information (for example, "NO ACCESS") indicating whether the zoom in or zoom out of the three-dimensional image object 1220 is possible.

According to various embodiments of the present disclosure, as the zoom in/out state indication 1222 indicates impossibility of the zoom in or zoom out function, the electronic device may further display the object rotation button 1223 on the screen 1210 of the three-dimensional image. For example, the object rotation button 1223 may include a right rotation indicator 1223*a* and a left rotation indicator 1223*b* indicating rotations in a right direction and a left direction according to the rotation direction of the wheel input received from the external electronic device.

According to various embodiments of the present disclosure, when a third wheel input indicating a rotation input in a rightwards direction is received from the external electronic device, the electronic device may rotate the three-dimensional image object 1220 in the rightwards direction in accordance with the rotation quantity of the third wheel input. For example, as the three-dimensional image object 1220 rotates in the right direction according to the third wheel input, the electronic device may change and display a color or a size of the right rotation indicator 1223*a*.

According to various embodiments of the present disclosure, when a fourth wheel input indicating a rotation input in a leftwards direction is received from the external electronic device, the electronic device may rotate the three-dimensional image object 1220 in the leftwards direction in accordance with the rotation quantity of the fourth wheel input. For example, when the three-dimensional image object 1220 rotates in the left direction according to the fourth wheel input, the electronic device may change and display a color or a size of the left rotation indicator 1223*b*.

FIG. 13 is a block diagram illustrating an example of a network environment, according to various embodiments of the present disclosure.

Referring to FIG. 13, an electronic device 1300 within a network environment 1301 is illustrated, and the electronic device 1301 may include a bus 1310, a processor 1320, a memory 1330, an input/output interface 1350, a display 1360, and a communication interface 1370.

According to various embodiments of the present disclosure, the electronic device 1301 may omit at least one of the elements, or may additionally include another element. The bus 1310 may include, for example, a circuit that interconnects the elements 1310 to 1370 and transmits communication (for example, control messages or data) between the elements. The processor 1320 may include one or more of a central processing unit, an application processor, and a communication processor (CP). The processor 1320, for example, may carry out operations or data processing relating to the control and/or communication of at least one other element of the electronic device 1301.

The memory 1330 may include volatile and/or non-volatile memory. The memory 1330 may store, for example, instructions or data relevant to at least one other element of the electronic device 1301. According to an embodiment, the memory 1330 may store software and/or a program 1340. The program 1340 may include, for example, a kernel 1341, middleware 1343, an application programming interface (API) 1345, and/or application programs (or "applications") 1347. At least some of the kernel 1341, the middleware 1343, and the API 1345 may be referred to as an operating system. The kernel 1341 may control or manage system resources (for example, the bus 1310, the processor 1320, or the memory 1330) used for executing an operation or function implemented by other programs (for example, the middleware 1343, the API 1345, or the application 1347). Furthermore, the kernel 1341 may provide an interface through which the middleware 1343, the API 1345, or the application programs 1347 may access the individual elements of the electronic device 1301 to control or manage the system resources.

The middleware 1343 may function as, for example, an intermediary for allowing the API 1345 or the application programs 1347 to communicate with the kernel 1341 to exchange data. Furthermore, the middleware 1343 may process one or more task requests, which are received from the application programs 1347, according to priorities thereof. For example, the middleware 1343 may assign priorities for using the system resources (for example, the bus 1310, the processor 1320, the memory 1330, or the like) of the electronic device 1301 to one or more of the application programs 1347, and may process the one or more task requests. The API 1345 is an interface used by the application 1347 to control a function provided from the kernel 1341 or the middleware 1343, and may include, for example, at least one interface or function (for example, an instruction) for a file control, a window control, image processing, a character control, or the like. For example, the input/output interface 1350 may forward instructions or data, which is input from a user or an external device, to the other element(s) of the electronic device 1301, or may output instructions or data, which is received from the other element(s) of the electronic device 1301, to the user or the external device.

The display 1360 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 1360 may display, for example, various types of content (e.g., text, images, videos, icons, and/or symbols) for a user. The display 1360 may include a touch screen and may receive, for example, a touch, gesture, proximity, or hovering input using an electronic pen or the user's body part. The communication interface 1370 may configure communication, for example, between the electronic device 1301 and an external device (for example, a first external electronic device 1302, a second external electronic device 1304, or a server 1306). For example, the communication interface 1370 may be connected to a network 1362 through wireless or wired communication to communicate with the external device (for example, the second external electronic device 1304 or the server 1306).

The wireless communication may include, for example, a cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth low energy (BLE), ZigBee, near field communication (NFC), magnetic secure transmission, Radio Frequency (RF), and body area network (BAN). According to an embodiment, the wired communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 1362 may include a telecommunications network, for example, at least one of a computer network (for example, a LAN or a WAN), the Internet, and a telephone network.

Each of the first and second external electronic devices 1302 and 1304 may be of the same or a different type from the electronic device 1301. According to various embodiments, all or some of the operations performed by the electronic device 1301 may be performed by another electronic device or a plurality of electronic devices (for example, the electronic device 1302 or 1304 or the server 1306). According to an embodiment, when the electronic device 1301 has to perform some functions or services automatically or in response to a request, the electronic device 1301 may make a request for performing at least some functions relating thereto to another device (for example, the electronic device 1302 or 1304 or the server 1306) instead of performing the functions or services by itself or in addition thereto. Another electronic device (for example, the electronic device 1302 or 1304, or the server 1306) may execute the requested functions or the additional functions, and may deliver a result of the execution to the electronic device 1301. The electronic device 1301 may provide the received result as it is, or may additionally process the received result to provide the requested functions or services. To this end, for example, cloud computing, distributed computing, or client-server computing technology may be used.

Figure 14:
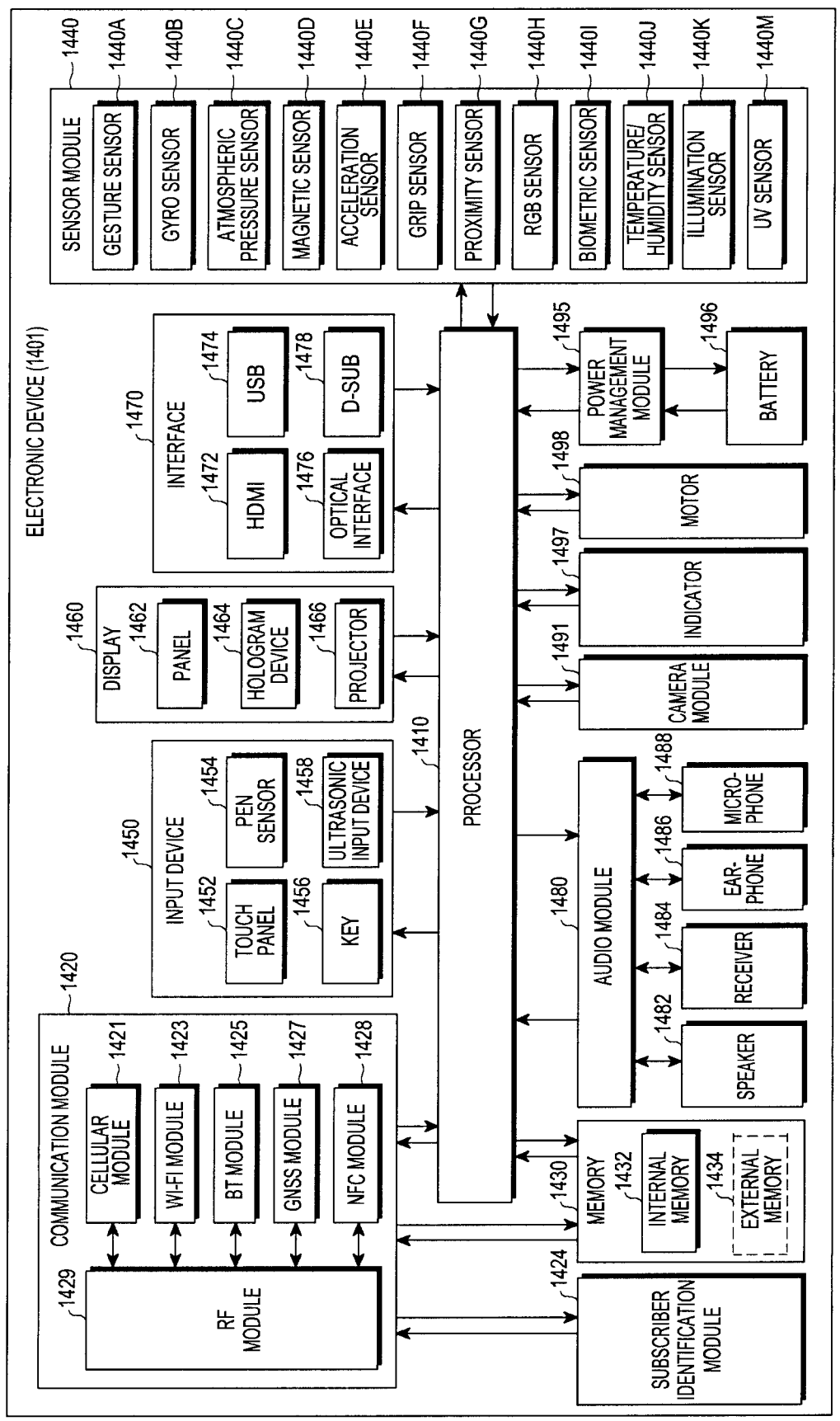
FIG. 14 is a block diagram illustrating an example of a configuration of an electronic device according to various embodiments of the present disclosure.

FIG. 14 is a block diagram illustrating an example of a configuration of an electronic device according to various embodiments of the present disclosure.

According to various embodiments of the present disclosure, an electronic device 1401 may include all or some of the elements of the electronic device 1301 illustrated in FIG. 13.

Referring to FIG. 14, the electronic device 1401 may include one or more processors (for example, APs) 1410, a communication module 1420, a subscriber identification module 1424, a memory 1430, a sensor module 1440, an input device 1450, a display 1460, an interface 1470, an audio module 1480, a camera module 1491, a power management module 1495, a battery 1496, an indicator 1497, and a motor 1498. The processor 1410 may control a plurality of hardware or software elements connected thereto and may perform various data processing and operations by driving an operating system or an application program. The processor 1410 may be implemented by, for example, a System on Chip (SoC). According to an embodiment, the processor 1410 may further include a graphic processing unit (GPU) and/or an image signal processor. The processor 1410 may also include at least some (for example, a cellular module 1421) of the elements illustrated in FIG. 14. The processor 1410 may load, in volatile memory, instructions or data received from at least one of the other elements (for example, non-volatile memory), process the loaded instructions or data, and store the resultant data in the non-volatile memory.

The communication module 1420 may have a configuration that is the same as or similar to that of the communication interface 1370. The communication module 1420 (for example, the communication interface 170) may include, for example, a cellular module 1421, a Wi-Fi module 1423, a Bluetooth module 1425, a GNSS module 1427, an NFC module 1428, and an RF module 1429. The communication module 1420 may provide local network connection 1364 for electronic device 1302. The cellular module 1421 may provide, for example, a voice call, a video call, a text message service, an Internet service, or the like through a communication network. According to an embodiment, the cellular module 1421 may identify and authenticate the electronic device 1401 within a communication network using the subscriber identification module 1424 (for example, a SIM card). According to an embodiment, the cellular module 1421 may perform at least some of the functions that the processor 1410 may provide. According to an embodiment, the cellular module 1421 may include a communication processor (CP). According to some embodiments, at least some (for example, two or more) of the cellular module 1421, the Wi-Fi module 1423, the BT module 1425, the GNSS module 1427, and the NFC module 1428 may be included in one Integrated Chip (IC) or IC package. The RF module 1429 may transmit/receive, for example, a communication signal (for example, an RF signal). The RF module 1429 may include, for example, a transceiver, a power amp module (PAM), a frequency filter, a low noise amplifier (LNA), an antenna, or the like. According to another embodiment, at least one of the cellular module 1421, the Wi-Fi module 1423, the BT module 1425, the GPS module 1427, and the NFC module 1428 may transmit/receive an RF signal through a separate RF module. The subscriber identification module 1424 may include, for example, a card that includes a subscriber identification module, or an embedded SIM, and may contain unique identification information (for example, an integrated circuit card identifier (ICCID)) or subscriber information (for example, international mobile subscriber identity (IMSI)).

The memory 1430 (for example, the memory 1330) may include, for example, an internal memory 1432 or an external memory 1434. The internal memory 1432 may include, for example, at least one of a volatile memory (for example, a DRAM, an SRAM, an DRAM, or the like) and a non-volatile memory (for example, a One Time Programmable ROM (OTPROM), a PROM, an EPROM, an EEPROM, a mask ROM, a flash ROM, a flash memory, a hard disc drive, or a Solid State Drive (SSD)). The external memory 1434 may include a flash drive, for example, a compact flash (CF), a secure digital (SD), a Micro-SD, a Mini-SD, an eXtreme digital (xD), a multi-media card (MMC), a memory stick, and the like. The external memory 1434 may be functionally and/or physically connected to the electronic device 1401 through various interfaces.

The sensor module 1440 may, for example, measure a physical quantity or detect the operating state of the electronic device 1401 and may convert the measured or detected information into an electrical signal. The sensor module 1440 may include, for example, at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G; a color sensor 1440H (for example, a Red, Green, and Blue (RGB) sensor), a biometric sensor 1440I, a temperature/humidity sensor 1440J, an illumination sensor 1440K, and a ultraviolet (UV) sensor 1440M. Additionally or alternatively, the sensor module 1440 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling one or more sensors included therein. In some embodiments, the electronic device 1401 may further include a processor configured to control the sensor module 1440 as a part of or separately from the processor 1410, and may control the sensor module 1440 while the processor 1410 is in a sleep state.

The input device 1450 may include, for example, a rotation input device 1451, a touch panel 1452, a (digital) pen sensor 1454, a key 1456, or an ultrasonic input device 1458. The touch panel 1452 may use, for example, at least one of a capacitive type, a resistive type, an infrared type, and an ultrasonic type. Furthermore, the touch panel 1452 may further include a control circuit. The touch panel 1452 may further include a tactile layer to provide a tactile reaction to a user. The (digital) pen sensor 1454 may include, for example, a recognition sheet that is a part of, or separate from, the touch panel. The key 1456 may include, for example, a physical button, an optical key, or a keypad. The ultrasonic input device 1458 may detect ultrasonic waves, which are generated by an input tool, through a microphone (for example, a microphone 1488) to identify data corresponding to the detected ultrasonic waves.

According to various embodiments of the present disclosure, the rotation input device 1451 may be functionally connected to a wheel dial member or a wheel scroll button to receive a wheel input from the outside. For example, when the selected object is displayed to move through the display 1460, the electronic device 1401 may display an interface for controlling the execution of an application or content according to a wheel input based on a location to which the selected object is moved, and the execution of the application or the content may be controlled based on the received wheel input in the state in which the interface is displayed.

The display 1460 (for example, the display 1360) may include a panel 1462, a hologram device 1464, a projector 1466, and/or a control circuit for controlling them. The panel 1462 may be implemented to be, for example, flexible, transparent, or wearable. The panel 1462, together with the touch panel 1452, may be configured as one or more modules. According to an embodiment, the panel 1462 may include a pressure sensor (or a POS sensor) which may measure a strength of pressure of a user's touch. The pressure sensor may be implemented so as to be integrated with the touch panel 1452 or may be implemented as one or more sensors separate from the touch panel 1452. The hologram device 1464 may show a three dimensional image in the air by using an interference of light. The projector 1466 may display an image by projecting light onto a screen. The screen may be located, for example, in the interior of, or on the exterior of, the electronic device 1401. The interface 1470 may include, for example, an HDMI 1472, a USB 1474, an optical interface 1476, or a D-subminiature (D-sub) 1478. The interface 1470 may be included, for example, in the communication interface 1370 illustrated in FIG. 13. Additionally or alternatively, the interface 1470 may, for example, include a mobile high-definition link (MHL) interface, a secure digital (SD) card/multi-media card (MMC) interface, or an infrared data association (IrDA) standard interface.

The audio module 1480 may convert, for example, sound into an electrical signal, and vice versa. At least some elements of the audio module 1480 may be included, for example, in the input/output interface 1350 illustrated in FIG. 13. The audio module 1480 may process sound information that is input or output through, for example, a speaker 1482, a receiver 1484, earphones 1486, the microphone 1488, and the like. The camera module 1491 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 1495 may manage, for example, the power of the electronic device 1401. According to an embodiment, the power management module 1495 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 1496 and a voltage, current, or temperature while charging. The battery 1496 may include, for example, a rechargeable battery and/or a solar battery.

The indicator 1497 may display a particular state, for example, a booting state, a message state, a charging state, or the like of the electronic device 1401 or a part (for example, the processor 1410) of the electronic device 141. The motor 1498 may convert an electrical signal into a mechanical vibration and may generate a vibration, a haptic effect, or the like. The electronic device 1401 may include a mobile TV support device (for example, GPU) that may process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. In various embodiments, an electronic device (for example, the electronic device 1401) may omit some elements or may further include additional elements, or some of the elements of the electronic device may be combined with each other to configure one entity, in which case the electronic device may identically perform the functions of the corresponding elements prior to the combination.

Figure 15:
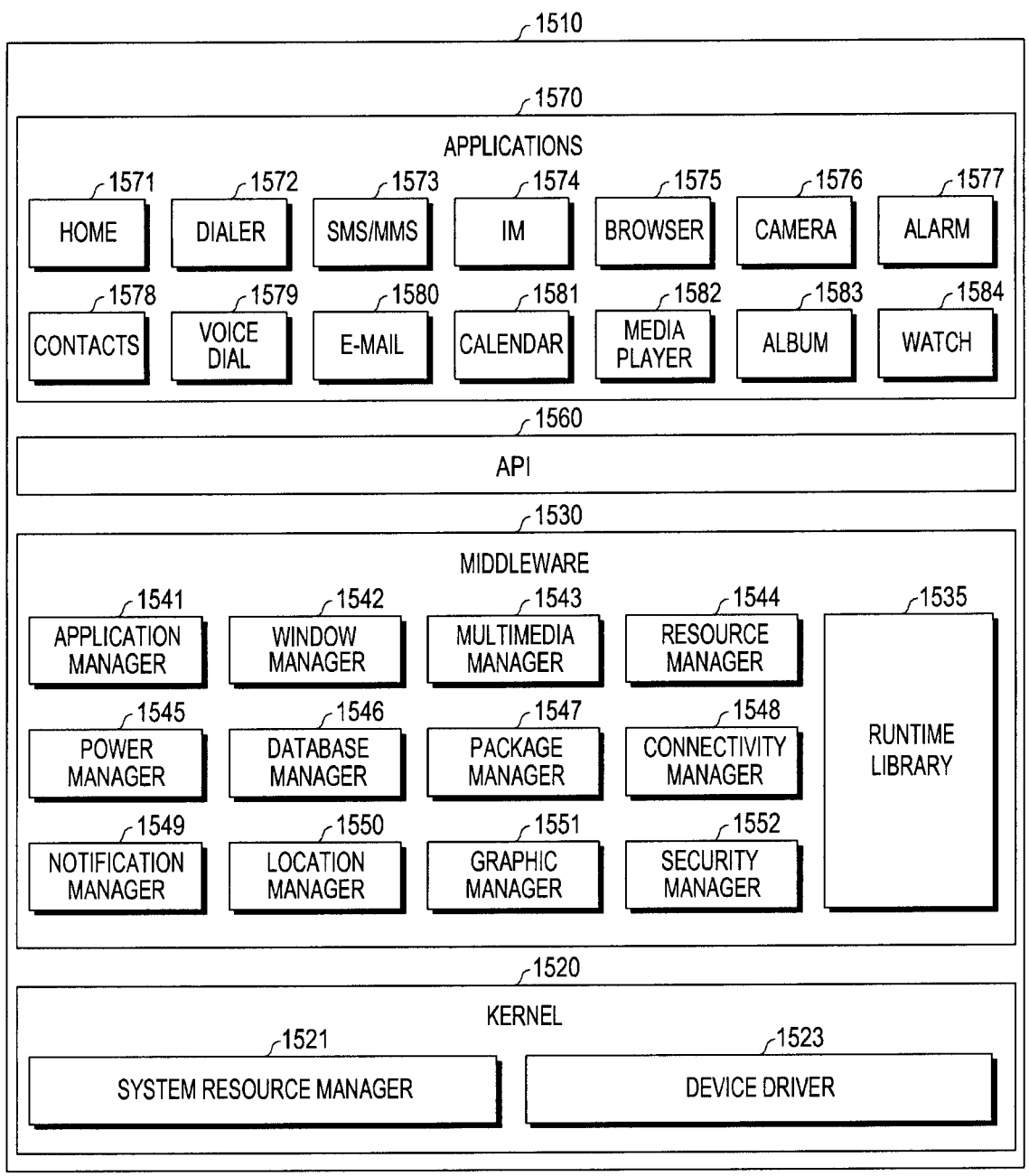
FIG. 15 is a block diagram illustrating an example of a configuration of a program module according to various embodiments of the present disclosure.

FIG. 15 is a block diagram illustrating an example of a configuration of a program module according to various embodiments of the present disclosure.

According to various embodiments of the present disclosure, a program module 1510 (for example, the program 1540) may include an operating system that controls resources related to the electronic device (for example, the electronic device 1501) and/or various applications (for example, the application programs 1547) driven on the operating system. The operating system may include, for example, Android™, iOS™, Windows™, Symbian™, Tizen™, or Bada™.

Referring to FIG. 15, the program module 1510 may include a kernel, middleware 1530, an API 1560, and/or applications 1570. At least a part of the program module 1510 may be preloaded on the electronic device, or may be downloaded from an external electronic device (for example, the electronic device 1302 or 1304 or the server 1306).

The kernel 1520 may include, for example, a system resource manager 1521 and/or a device driver 1523. The system resource manager 1521 may control, allocate, or retrieve system resources. According to an embodiment, the system resource manager 1521 may include a process manager, a memory manager, or a file system manager. The device driver 1523 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 1530 may provide, for example, a function required by the applications 1570 in common, or may provide various functions to the applications 1570 through the API 1560 such that the applications 1570 can efficiently use limited system resources within the electronic device. According to an embodiment, the middleware 1530 may include at least one of a runtime library 1535, an application manager 1541, a window manager 1542, a multi-media manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535 may include, for example, a library module that a compiler uses in order to add a new function through a programming language while the applications 1570 are being executed. The runtime library 1535 may manage an input/output, manage a memory, or process an arithmetic function. The application manager 1541 may manage, for example, the life cycles of the applications 1570. The window manager 1542 may manage GUI resources used for a screen. The multimedia manager 1543 may identify formats required for reproducing various media files and may encode or decode a media file using a codec suitable for the corresponding format. The resource manager 1544 may manage the source code of the applications 1570 or the space in memory. The power manager 1545 may manage, for example, the capacity or power of a battery and may provide power information required for operating the electronic device. According to an embodiment, the power manager 1545 may operate in conjunction with a basic input/output system (BIOS). The database manager 1546 may, for example, generate, search, or change databases to be used by the applications 1570. The package manager 1547 may manage the installation or update of an application that is distributed in the form of a package file.

The connectivity manager 1548 may manage, for example, a wireless connection. The notification manager 1549 may provide an event (for example, an arrival message, an appointment, a proximity notification, or the like) to a user. The location manager 1550 may manage, for example, the location information of the electronic device. The graphic manager 1551 may manage a graphic effect to be provided to a user and a user interface relating to the graphic effect. The security manager 1552 may provide, for example, system security or user authentication. According to an embodiment, the middleware 1530 may include a telephony manager for managing a voice or video call function of the electronic device or a middleware module that is capable of forming a combination of the functions of the above-described elements. According to an embodiment, the middleware 1530 may provide specialized modules according to the types of operation systems. Furthermore, the middleware 1530 may dynamically remove some of the existing elements, or may add new elements. The API 1560 is, for example, a set of API programming functions, and may be provided with different configurations according to operating systems. For example, with respect to each platform, one API set may be provided in the case of Android or iOS, and two or more API sets may be provided in the case of Tizen.

The applications 1570 may include, for example, one or more applications that can perform functions such as a home application 1571, a dialer application 1572, an SMS/MMS application 1573, an instant messaging (IM) application 1574, a browser application 1575, a camera application 1576, an alarm application 1577, a contact application 1578, a voice dial application 1579, an e-mail application 1580, a calendar application 1581, a media player application 1582, an album application 1583, a watch application 1584, a health-care application (for example, for measuring exercise quantity or blood glucose), an environment information (for example, atmospheric pressure, humidity, or temperature information) provision application, and the like. According to an embodiment, the applications 1570 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update the functions (for example, turning on/off the external electronic device itself (or some elements thereof) or adjusting the brightness (or resolution) of a display) of an external electronic device that communicates with the electronic device or applications executed in the external electronic device. According to an embodiment, the applications 1570 may include applications (for example, a health care application of a mobile medical appliance) that are designated according to the attributes of an external electronic device. According to an embodiment, the applications 1570 may include applications received from an external electronic device. At least some of the program module 1510 may be implemented (for example, executed) by software, firmware, hardware (for example, the processor 1410), or a combination of two or more thereof and may include a module, a program, a routine, an instruction set, or a process for performing one or more functions. The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 1430) in the form of a program module. The instruction, when executed by a processor (e.g., the processor 1410), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium storing instructions is provided. The instructions may be configured to cause at least one processor, when executed by the at least one processor, to perform at least one operation. The at least one operation may include: an operation of, when a functional connection with an external electronic device is identified, an operation of displaying at least one window corresponding to at least one application; moving and displaying a selected object according to a first input received from the external electronic device; an operation of, when the selected object is located on a first window of the at least one window corresponding to a first application, displaying a first user interface for controlling the first application on the first window; and an operation of scrolling and displaying a content provided by the first application on the first window according to a second input received from the external electronic device while the first user interface is displayed on the first window.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device, comprising:
   a display device;
   a communication unit for communicating with an external electronic device;
   a processor functionally connected to the display device; and
   a memory functionally connected to the processor, storing instructions executable by the processor to cause the processor to:
   while the electronic device is mounted on a wearable device, control the display device to display a plurality of windows corresponding to a plurality of applications as a three-dimensional image,
   control the display device to indicate selection of a window of the plurality of windows responsive to a first input received from the external electronic device,
   when a first window of the plurality of windows is selected, identify a type of a first application corresponding to the first window,
   control the display device to display a first user interface corresponding to the identified type of the first application within the first window of the three-dimensional image, the first user interface including an interface for scrolling and displaying a previous file or a next file of a file displayed on the display device from among a first plurality of files corresponding to the first application,
   receive a second input from the external electronic device through the communication unit, wherein the second input is a wheel input made through a wheel input device included in the external electronic device, and
   in response to receiving the second input from the external electronic device, control the display device to scroll and display the previous file or the next file of the file displayed on the display device based on at least one of a number of rotations of the wheel input, a rotation direction of the wheel input or a rotation speed of the wheel input.

2. The electronic device of claim 1,
   wherein the first input includes a gesture input detected through a sensor of the external electronic device.

3. The electronic device of claim 1, wherein the file includes a video or a first three-dimensional image, and
   wherein the instructions are configured to enable the processor to:
   control the display device to display the video or the first three-dimensional image in the first window according to the number of rotations indicated by the second input.

4. The electronic device of claim 3, wherein the instructions are configured to enable the processor to:
   receive a third input from the external electronic device through the communication unit, the third input indicating a predetermined number of rotations while the video is displayed,
   responsive to the third input, change the first user interface to include an indicator indicating a particular playback position within the video, and
   in response to receiving a first wheel input from the external electronic device while the indicator is displayed, initiate playback of the video beginning from the particular playback position.

5. The electronic device of claim 3,
   wherein the instructions are configured to enable the processor to:
   control the display device to display a third user interface for controlling the display of the three-dimensional image, responsive to a second wheel input received from the external electronic device while the three-dimensional image is displayed.

6. The electronic device of claim 5,
   wherein the third user interface includes a function executing zoom-in and zoom-out on the three-dimensional image,
   wherein the three-dimensional image is rotatable according to the number of rotations or the rotation direction of the second wheel input, and
   wherein when the zoom-in or the zoom-out of the three-dimensional image is disallowed, the third user interface further includes an indicator indicating rotatability of the three-dimensional image based on the second wheel input.

7. The electronic device of claim 2, wherein the instructions are configured to enable the processor to:
   in response to receiving the first input from the external electronic device after the second input, control the display device to display a movement of the selected window according to a movement angle or a movement speed indicated by the gesture input of the first input.

8. The electronic device of claim 7, wherein the instructions are configured to enable the processor to:
   in response to identifying a second window as the selected window based on the first input including the gesture input, control the display device to remove the first user interface and display a second user interface corresponding to a second application displayed within the second window.

9. The electronic device of claim 1, wherein the instructions are configured to enable the processor to:
in response to executing a function of the first application responsive to the second input, control the display device to change at least one of a size and a color of an indicator included in the first user interface.

10. A method in an electronic device, comprising:
while the electronic device is mounted on a wearable device, displaying a plurality of windows corresponding to a plurality of applications as a three-dimensional image;
displaying an indicator indicating a selection of a window of the plurality of windows responsive to a first input received from a external electronic device;
when a first window of the plurality of windows is selected, identifying a type of a first application corresponding to the first window;
displaying a first user interface corresponding to the identified type of the first application within the first window of the three-dimensional image, the first user interface including an interface for scrolling and displaying a previous file or a next file of a file displayed on the electronic device from among a first plurality of files corresponding to the first application;
receiving a second input from the external electronic device, wherein the second input is a wheel input made through a wheel input device included in the external electronic device; and
in response to receiving the second input from the external electronic device, scrolling and displaying the previous file or the next file of the file displayed on the electronic device based on at least one of a number of rotations of the wheel input, a rotation direction of the wheel input or a rotation speed of the wheel input.

11. The method of claim 10, wherein the first input includes a gesture input detected through a sensor of the external electronic device.

12. The method of claim 10, wherein the file a video or a first three-dimensional image, the method further comprises:
displaying the video or the first three-dimensional image in the first window according to the number of rotations indicated by the second input.

13. The method of claim 12, further comprising:
receiving a third input from the external electronic device, the third input indicating a predetermined number of rotations while the video is displayed;
responsive to the third input, changing the first user interface to include an indicator indicating a particular playback position within the video; and
in response to receiving a first wheel input from the external electronic device while the indicator is displayed, initiating playback of the video beginning from the particular playback position.

14. The method of claim 12, further comprising:
displaying a third user interface for controlling the display of the three-dimensional image, responsive to a second wheel input received from the external electronic device while the three-dimensional image is displayed.

15. The method of claim 14,
wherein the third user interface includes a function executing zoom-in and zoom-out on the three-dimensional image,
wherein the three-dimensional image is rotatable according to the number of rotations or the rotation direction of the second wheel input, and
wherein when the zoom-in or the zoom-out of the three-dimensional image is disallowed, the third user interface further includes an indicator indicating rotatability of the three-dimensional image based on the second wheel input.

16. The method of claim 11, further comprising:
in response to receiving the first input from the external electronic device after the second input, displaying a movement of the selected window according to a movement angle or a movement speed indicated by the gesture input of the first input.

17. The method of claim 16, further comprising:
in response to identifying a second window as the selected window based on the first input including the gesture input, removing the first user interface and displaying a second user interface corresponding to a second application displayed within the second window.

18. The method of claim 10, further comprising:
in response to executing a function of the first application responsive to the second input, changing at least one of a size and a color of an indicator included in the first user interface.

19. A non-transitory storage medium storing instructions executable by at least one processor to cause the at least one processor to perform at least one operation, the at least one operation comprising:
while an electronic device is mounted on a wearable device, displaying a plurality of windows corresponding to a plurality of applications as a three-dimensional image;
displaying an indicator indicating a selection of a window of the plurality of windows responsive to a first input received from a external electronic device;
when a first window of the plurality of windows is selected, identifying a type of a first application corresponding to the first window;
displaying a first user interface corresponding to the identified type of the first application within the first window of the three-dimensional image, the first user interface including an interface for scrolling and displaying a previous file or a next file of a file displayed on the electronic device from among a first plurality of files corresponding to the first application;
receiving a second input from the external electronic device, wherein the second input is a wheel input made through a wheel input device included in the external electronic device; and
in response to receiving the second input from the external electronic device, scrolling and displaying the previous file or the next file of the file displayed on the electronic device based on at least one of a number of rotations of the wheel input, a rotation direction of the wheel input or a rotation speed of the wheel input.

* * * * *